US012656506B2

(12) United States Patent
Kleeman et al.

(10) Patent No.: US 12,656,506 B2
(45) Date of Patent: *Jun. 16, 2026

(54) SYSTEM AND METHOD FOR GAUSSIAN PROCESS ENHANCED GNSS CORRECTIONS GENERATION

(71) Applicant: Swift Navigation, Inc., San Francisco, CA (US)

(72) Inventors: Alexander Thomas Kleeman, San Francisco, CA (US); Seth Toplosky, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 279 days.

This patent is subject to a terminal disclaimer.

(21) Appl. No.: 18/390,747

(22) Filed: Dec. 20, 2023

(65) Prior Publication Data

US 2024/0142637 A1 May 2, 2024

Related U.S. Application Data

(60) Division of application No. 17/554,397, filed on Dec. 17, 2021, which is a continuation-in-part of application No. 16/983,706, filed on Aug. 3, 2020, now Pat. No. 11,237,276.

(60) Provisional application No. 62/881,520, filed on Aug. 1, 2019.

(51) Int. Cl.
*G01S 19/40* (2010.01)
*G01S 19/07* (2010.01)
*G01S 19/44* (2010.01)

(52) U.S. Cl.
CPC .............. *G01S 19/40* (2013.01); *G01S 19/07* (2013.01); *G01S 19/072* (2019.08); *G01S 19/44* (2013.01)

(58) Field of Classification Search
CPC ........ G01S 19/40; G01S 19/072; G01S 19/07; G01S 19/44
See application file for complete search history.

(56) References Cited

U.S. PATENT DOCUMENTS

| | | | |
|---|---|---|---|
| 5,451,964 A | 9/1995 | Babu | |
| 5,490,076 A | 2/1996 | Rawicz et al. | |
| 5,610,614 A | 3/1997 | Talbot et al. | |
| 5,825,326 A | 10/1998 | Semler et al. | |
| 5,867,411 A | 2/1999 | Kumar | |

(Continued)

FOREIGN PATENT DOCUMENTS

| | | |
|---|---|---|
| AU | 2007300586 A1 | 4/2008 |
| CA | 2782149 A1 | 6/2011 |

(Continued)

OTHER PUBLICATIONS

"An Introduction to GNSS, Chapter 4, GNSS Error Sources", https://novatel. com/an-introduction-to-gnss/chapter-4-gnsserror-sources, published 2015.

(Continued)

*Primary Examiner* — William Kelleher
*Assistant Examiner* — Hailey R Le
(74) *Attorney, Agent, or Firm* — Jeffrey Schox; Randy Mehlenbacher

(57) ABSTRACT

A system and method for generating a set of GNSS corrections using a GNSS corrections model comprising a Gaussian process.

11 Claims, 7 Drawing Sheets

(56) References Cited

U.S. PATENT DOCUMENTS

| | | | |
|---|---|---|---|
| 5,935,196 A | 8/1999 | Brodie et al. | |
| 5,991,691 A | 11/1999 | Johnson | |
| 6,009,376 A | 12/1999 | Brodie et al. | |
| 6,127,968 A | 10/2000 | Lu | |
| 6,205,400 B1 | 3/2001 | Lin | |
| 6,278,945 B1 | 8/2001 | Lin | |
| 6,317,688 B1 | 11/2001 | Bruckner et al. | |
| 6,408,245 B1 | 6/2002 | An et al. | |
| 6,424,914 B1 | 7/2002 | Lin | |
| 6,427,122 B1 | 7/2002 | Lin | |
| 6,453,237 B1 | 9/2002 | Fuchs et al. | |
| 6,552,680 B1 | 4/2003 | Barber et al. | |
| 6,628,231 B2 | 9/2003 | Mayersak | |
| 6,647,340 B1 | 11/2003 | Pemble et al. | |
| 6,691,066 B1 | 2/2004 | Brodie | |
| 6,727,849 B1 | 4/2004 | Kirk et al. | |
| 6,735,264 B2 | 5/2004 | Miller | |
| 6,753,810 B1 | 6/2004 | Yang et al. | |
| 6,799,116 B2 | 9/2004 | Robbins | |
| 6,816,117 B2 | 11/2004 | Fink et al. | |
| 6,856,905 B2 | 2/2005 | Pasturel et al. | |
| 6,864,836 B1 | 3/2005 | Hatch et al. | |
| 7,026,982 B2 | 4/2006 | Toda et al. | |
| 7,158,885 B1 | 1/2007 | Janky et al. | |
| 7,219,013 B1 | 5/2007 | Young et al. | |
| 7,289,061 B2 | 10/2007 | Komjathy et al. | |
| 7,292,183 B2 | 11/2007 | Bird et al. | |
| 7,298,325 B2 | 11/2007 | Krikorian et al. | |
| 7,382,313 B1 | 6/2008 | Goad | |
| 7,409,289 B2 | 8/2008 | Coatantiec et al. | |
| 7,538,721 B2 | 5/2009 | Vollath et al. | |
| 7,692,578 B2 | 4/2010 | Vollath et al. | |
| 7,696,922 B2 | 4/2010 | Nicholson et al. | |
| 7,746,272 B2 | 6/2010 | Vollath | |
| 8,013,789 B2 | 9/2011 | Van et al. | |
| 8,027,413 B2 | 9/2011 | Lillo et al. | |
| 8,085,190 B2 | 12/2011 | Sengupta et al. | |
| 8,089,402 B2 | 1/2012 | Maenpa et al. | |
| 8,094,065 B2 | 1/2012 | Henkel | |
| 8,134,497 B2 | 3/2012 | Janky et al. | |
| 8,193,976 B2 | 6/2012 | Shen et al. | |
| 8,255,155 B1 | 8/2012 | Crane et al. | |
| 8,368,590 B2 | 2/2013 | Vollath et al. | |
| 8,368,591 B2 | 2/2013 | Talbot et al. | |
| 8,416,133 B2 | 4/2013 | Hatch et al. | |
| 8,447,517 B2 | 5/2013 | Roh | |
| 8,510,041 B1 | 8/2013 | Anguelov et al. | |
| 8,542,146 B2 | 9/2013 | Vollath | |
| 8,587,475 B2 | 11/2013 | Leandro | |
| 8,610,624 B2 | 12/2013 | Savoy | |
| 8,704,708 B2 | 4/2014 | Vollath | |
| 8,704,709 B2 | 4/2014 | Vollath et al. | |
| 8,756,001 B2 | 6/2014 | Georgy et al. | |
| 8,760,343 B2 | 6/2014 | Milyutin et al. | |
| 8,773,303 B2 | 7/2014 | Doucet et al. | |
| 8,816,903 B2 | 8/2014 | Sengupta et al. | |
| 8,825,456 B2 | 9/2014 | Vasudevan et al. | |
| 8,830,121 B2 | 9/2014 | Vollath | |
| 8,831,877 B2 | 9/2014 | Anguelov et al. | |
| 8,847,820 B2 | 9/2014 | Landau et al. | |
| 8,860,609 B2 | 10/2014 | Roh | |
| 8,996,311 B1 | 3/2015 | Morin et al. | |
| 9,031,782 B1 | 5/2015 | Lemay et al. | |
| 9,069,073 B2 | 6/2015 | Ramakrishnan et al. | |
| 9,128,176 B2 | 9/2015 | Seeger | |
| 9,146,319 B2 | 9/2015 | Leandro | |
| 9,182,497 B2 | 11/2015 | Geier et al. | |
| 9,244,177 B2 | 1/2016 | Terashima | |
| 9,405,012 B2 | 8/2016 | Doucet et al. | |
| 9,405,016 B2 | 8/2016 | Yim | |
| 9,417,330 B2 | 8/2016 | Revol et al. | |
| 9,488,734 B2 | 11/2016 | Davain | |
| 9,557,422 B1 * | 1/2017 | Miller ................. G01S 19/073 | |
| 9,568,321 B2 | 2/2017 | Bharadwaj et al. | |
| 9,576,082 B2 | 2/2017 | Sparks et al. | |
| 9,602,974 B2 | 3/2017 | Rudow et al. | |
| 9,612,341 B2 | 4/2017 | Large et al. | |
| 9,651,667 B2 | 5/2017 | Leandro et al. | |
| 9,671,501 B2 | 6/2017 | Leandro et al. | |
| 9,709,683 B2 | 7/2017 | Leandro et al. | |
| 9,784,844 B2 | 10/2017 | Kana et al. | |
| 9,857,474 B2 | 1/2018 | Tan et al. | |
| 9,927,530 B2 | 3/2018 | Boyarski | |
| 9,933,528 B2 | 4/2018 | Horn et al. | |
| 10,018,729 B2 | 7/2018 | Dunik et al. | |
| 10,101,464 B2 | 10/2018 | Appleford et al. | |
| 10,191,157 B2 | 1/2019 | Dai et al. | |
| 10,260,888 B2 | 4/2019 | Takahashi | |
| 10,267,924 B2 | 4/2019 | Ramanandan et al. | |
| 10,274,606 B1 | 4/2019 | Phan et al. | |
| 10,393,879 B2 | 8/2019 | Saito et al. | |
| 10,422,885 B2 | 9/2019 | Dai et al. | |
| 10,459,593 B2 | 10/2019 | Tiwari et al. | |
| 10,473,790 B2 | 11/2019 | Noble et al. | |
| 10,564,296 B2 | 2/2020 | Hide et al. | |
| 10,578,747 B2 | 3/2020 | Grgich et al. | |
| 10,627,527 B2 | 4/2020 | Horn et al. | |
| 10,677,933 B1 | 6/2020 | Gavrilets et al. | |
| 10,690,775 B2 | 6/2020 | Jokinen | |
| 10,802,160 B2 | 10/2020 | Dai et al. | |
| 10,809,388 B1 | 10/2020 | Carcanague et al. | |
| 10,871,579 B2 | 12/2020 | Segal et al. | |
| 10,901,096 B2 | 1/2021 | Thrasher et al. | |
| 11,035,961 B2 | 6/2021 | Horn et al. | |
| 11,106,911 B1 | 8/2021 | Fathi et al. | |
| 11,131,774 B2 | 9/2021 | Miya et al. | |
| 11,143,762 B2 | 10/2021 | Takahashi et al. | |
| 11,156,718 B2 | 10/2021 | Takeda | |
| 11,187,813 B2 | 11/2021 | Brandl et al. | |
| 11,221,418 B2 | 1/2022 | Sleewaegen et al. | |
| 11,237,276 B2 | 2/2022 | Kleeman | |
| 11,255,976 B2 | 2/2022 | Strobel et al. | |
| 11,259,141 B2 | 2/2022 | Li et al. | |
| 11,300,689 B2 | 4/2022 | Noble et al. | |
| 11,327,182 B2 | 5/2022 | Zalewski et al. | |
| 11,333,772 B2 | 5/2022 | Del Regno et al. | |
| 11,378,699 B2 | 7/2022 | Segal et al. | |
| 11,422,269 B2 | 8/2022 | Ookubo et al. | |
| 11,422,271 B2 | 8/2022 | Talbot et al. | |
| 11,480,690 B2 | 10/2022 | Grgich et al. | |
| 11,550,067 B2 | 1/2023 | Reimer et al. | |
| 11,624,838 B2 | 4/2023 | Fine et al. | |
| 11,693,120 B2 | 7/2023 | Angelo et al. | |
| 11,733,397 B2 | 8/2023 | Reimer et al. | |
| 11,774,602 B1 | 10/2023 | Laine et al. | |
| 11,860,287 B2 | 1/2024 | Angelo et al. | |
| 11,953,608 B2 | 4/2024 | Hamada et al. | |
| 12,313,749 B2 | 5/2025 | Skupin et al. | |
| 12,415,525 B1 | 9/2025 | Automata et al. | |
| 2002/0097184 A1 | 7/2002 | Mayersak | |
| 2002/0120400 A1 | 8/2002 | Lin | |
| 2002/0180641 A1 | 12/2002 | Fink et al. | |
| 2003/0081705 A1 | 5/2003 | Miller | |
| 2003/0085840 A1 | 5/2003 | Benner et al. | |
| 2004/0006424 A1 | 1/2004 | Joyce et al. | |
| 2005/0001762 A1 | 1/2005 | Han et al. | |
| 2005/0001763 A1 | 1/2005 | Han et al. | |
| 2005/0024263 A1 | 2/2005 | Sharpe et al. | |
| 2005/0114023 A1 | 5/2005 | Williamson et al. | |
| 2005/0203702 A1 | 9/2005 | Sharpe et al. | |
| 2006/0074558 A1 | 4/2006 | Williamson et al. | |
| 2007/0120733 A1 | 5/2007 | Vollath et al. | |
| 2007/0126629 A1 | 6/2007 | Krikorian et al. | |
| 2008/0205521 A1 | 8/2008 | Van | |
| 2009/0018772 A1 | 1/2009 | Watanabe et al. | |
| 2009/0135057 A1 * | 5/2009 | Vollath .................... G01S 19/32 | |
| | | | 342/357.27 |
| 2009/0146873 A1 * | 6/2009 | Vanderwerf ............ G01S 19/20 | |
| | | | 342/357.58 |
| 2009/0184869 A1 | 7/2009 | Talbot et al. | |
| 2009/0224969 A1 | 9/2009 | Kolb | |
| 2009/0243929 A1 | 10/2009 | Sengupta et al. | |
| 2009/0262013 A1 | 10/2009 | Vollath | |
| 2009/0273511 A1 | 11/2009 | Schroth | |

(56) References Cited

U.S. PATENT DOCUMENTS

| | | |
|---|---|---|
| 2010/0033370 A1 | 2/2010 | Lopez et al. |
| 2010/0164788 A1 | 7/2010 | Ghaida |
| 2010/0164789 A1 | 7/2010 | Basnayake |
| 2010/0207810 A1 | 8/2010 | Terashima |
| 2010/0283675 A1 | 11/2010 | Mcaree et al. |
| 2010/0324822 A1 | 12/2010 | Coatantiec et al. |
| 2011/0050497 A1 | 3/2011 | Maenpa et al. |
| 2011/0090116 A1 | 4/2011 | Hatch et al. |
| 2011/0122022 A1 | 5/2011 | Van et al. |
| 2011/0140959 A1 | 6/2011 | Vollath |
| 2011/0148698 A1 | 6/2011 | Vollath |
| 2011/0156949 A1 | 6/2011 | Vollath et al. |
| 2011/0187589 A1 | 8/2011 | Gaal et al. |
| 2011/0187590 A1 | 8/2011 | Leandro |
| 2011/0260914 A1 | 10/2011 | Vollath et al. |
| 2011/0267226 A1 | 11/2011 | Talbot et al. |
| 2011/0316740 A1 | 12/2011 | Waters et al. |
| 2012/0112961 A1 | 5/2012 | Sengupta et al. |
| 2012/0146847 A1 | 6/2012 | Janky et al. |
| 2012/0154210 A1 | 6/2012 | Landau et al. |
| 2012/0154214 A1 | 6/2012 | Leandro |
| 2012/0154215 A1 | 6/2012 | Vollath et al. |
| 2012/0173195 A1 | 7/2012 | Opshaug et al. |
| 2012/0176271 A1 | 7/2012 | Dai et al. |
| 2012/0286991 A1* | 11/2012 | Chen ...................... G01S 19/32 342/357.23 |
| 2013/0050020 A1 | 2/2013 | Peck et al. |
| 2013/0099967 A1 | 4/2013 | Ramasubramanian et al. |
| 2013/0099970 A1 | 4/2013 | Lin et al. |
| 2013/0227377 A1 | 8/2013 | Rao et al. |
| 2013/0234885 A1 | 9/2013 | Geier et al. |
| 2013/0265191 A1 | 10/2013 | Ghinamo |
| 2013/0271318 A1 | 10/2013 | Landau et al. |
| 2013/0325328 A1 | 12/2013 | Anguelov et al. |
| 2013/0335264 A1 | 12/2013 | Revol et al. |
| 2014/0002300 A1 | 1/2014 | Leandro et al. |
| 2014/0015712 A1 | 1/2014 | Leandro et al. |
| 2014/0062765 A1 | 3/2014 | Brenner |
| 2014/0062776 A1 | 3/2014 | Ferguson et al. |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2014/0266876 A1 | 9/2014 | Tan et al. |
| 2014/0288825 A1 | 9/2014 | Czompo et al. |
| 2014/0375495 A1 | 12/2014 | Fleming et al. |
| 2015/0019464 A1 | 1/2015 | Nguyen-Tuong et al. |
| 2015/0168559 A1 | 6/2015 | Salazar et al. |
| 2015/0173037 A1 | 6/2015 | Pijl |
| 2015/0260848 A1 | 9/2015 | Mundt et al. |
| 2015/0270615 A1 | 9/2015 | Neenan |
| 2015/0293230 A1 | 10/2015 | Weed et al. |
| 2015/0293233 A1 | 10/2015 | De Jong |
| 2015/0369924 A1 | 12/2015 | Hedgecock et al. |
| 2016/0011318 A1 | 1/2016 | Cohen |
| 2016/0097859 A1 | 4/2016 | Hansen et al. |
| 2016/0116601 A1 | 4/2016 | Horn et al. |
| 2016/0195617 A1 | 7/2016 | Phatak et al. |
| 2016/0320493 A1 | 11/2016 | Wu et al. |
| 2016/0373263 A1 | 12/2016 | Zaidi et al. |
| 2017/0010936 A1 | 1/2017 | Daoud et al. |
| 2017/0131407 A1 | 5/2017 | Dunik et al. |
| 2017/0192102 A1 | 7/2017 | Wietfeldt |
| 2017/0254904 A1 | 9/2017 | Zhodzishsky et al. |
| 2017/0269216 A1 | 9/2017 | Dai et al. |
| 2017/0269222 A1 | 9/2017 | Dai et al. |
| 2017/0269227 A1 | 9/2017 | Dai et al. |
| 2017/0269231 A1 | 9/2017 | Dai et al. |
| 2017/0299730 A1 | 10/2017 | Lie et al. |
| 2017/0299731 A1 | 10/2017 | Lie et al. |
| 2017/0322313 A1 | 11/2017 | Revol et al. |
| 2018/0091939 A1 | 3/2018 | Venkatraman et al. |
| 2018/0113219 A1 | 4/2018 | Wuebbena |
| 2018/0120445 A1 | 5/2018 | Dill |
| 2018/0121814 A1* | 5/2018 | Yu ...................... G06N 3/0985 |
| 2018/0164442 A1 | 6/2018 | Thrasher et al. |
| 2018/0172838 A1 | 6/2018 | Junker et al. |
| 2018/0180743 A1 | 6/2018 | Hide et al. |
| 2018/0188032 A1 | 7/2018 | Ramanandan et al. |
| 2018/0246217 A1 | 8/2018 | Wuebbena |
| 2018/0252818 A1 | 9/2018 | Sato et al. |
| 2018/0283882 A1 | 10/2018 | He et al. |
| 2018/0299562 A1 | 10/2018 | Green |
| 2018/0306930 A1 | 10/2018 | Laine et al. |
| 2019/0004180 A1 | 1/2019 | Jokinen |
| 2019/0078895 A1 | 3/2019 | Ma et al. |
| 2019/0120970 A1 | 4/2019 | Mgen et al. |
| 2019/0154837 A1 | 5/2019 | Noble et al. |
| 2019/0187295 A1 | 6/2019 | Lee et al. |
| 2019/0187298 A1 | 6/2019 | Grgich et al. |
| 2019/0204450 A1 | 7/2019 | Revol |
| 2019/0243001 A1 | 8/2019 | Ookubo et al. |
| 2019/0302274 A1 | 10/2019 | Berntorp et al. |
| 2019/0339396 A1 | 11/2019 | Turunen |
| 2019/0339416 A1 | 11/2019 | Elkabetz et al. |
| 2019/0369265 A1 | 12/2019 | Jokinen |
| 2019/0383948 A1 | 12/2019 | Hoeferlin et al. |
| 2020/0025936 A1 | 1/2020 | Zhou et al. |
| 2020/0025937 A1 | 1/2020 | Kroeger et al. |
| 2020/0041654 A1 | 2/2020 | Noble et al. |
| 2020/0041658 A1 | 2/2020 | Laurichesse |
| 2020/0084586 A1 | 3/2020 | Rydén et al. |
| 2020/0096649 A1 | 3/2020 | Brandl et al. |
| 2020/0158886 A1 | 5/2020 | Segal et al. |
| 2020/0209406 A1* | 7/2020 | Lin ...................... G01S 19/40 |
| 2020/0233056 A1 | 7/2020 | Dolgov et al. |
| 2020/0257002 A1 | 8/2020 | Henkel |
| 2020/0271795 A1 | 8/2020 | Horn et al. |
| 2020/0348422 A1 | 11/2020 | Carcanague et al. |
| 2020/0379118 A1 | 12/2020 | Reid et al. |
| 2020/0408926 A1 | 12/2020 | Carcanague et al. |
| 2021/0026374 A1 | 1/2021 | Burghardt et al. |
| 2021/0033735 A1 | 2/2021 | Kleeman |
| 2021/0116579 A1 | 4/2021 | Rezaei |
| 2021/0141099 A1 | 5/2021 | Gunnarsson et al. |
| 2021/0165104 A1 | 6/2021 | Zalewski et al. |
| 2021/0165111 A1 | 6/2021 | Zalewski |
| 2021/0215831 A1 | 7/2021 | Takeda |
| 2021/0255336 A1 | 8/2021 | Noble et al. |
| 2021/0333413 A1 | 10/2021 | Zyryanov |
| 2021/0372793 A1 | 12/2021 | Nikulin et al. |
| 2021/0405213 A1 | 12/2021 | Tuck et al. |
| 2022/0011443 A1 | 1/2022 | De Wilde et al. |
| 2022/0018969 A1 | 1/2022 | Fine et al. |
| 2022/0057523 A1 | 2/2022 | Lee |
| 2022/0058322 A1 | 2/2022 | Brandl et al. |
| 2022/0107427 A1 | 4/2022 | Kleeman et al. |
| 2022/0163677 A1 | 5/2022 | Muthuraman et al. |
| 2022/0171053 A1 | 6/2022 | Park et al. |
| 2022/0317310 A1 | 10/2022 | He et al. |
| 2022/0397684 A1 | 12/2022 | Kee et al. |
| 2023/0026395 A1 | 1/2023 | Reimer et al. |
| 2023/0140535 A1 | 5/2023 | Ma et al. |
| 2023/0184956 A1 | 6/2023 | Cole et al. |
| 2023/0280476 A1 | 9/2023 | Reimer et al. |

FOREIGN PATENT DOCUMENTS

| | | |
|---|---|---|
| CA | 2718988 C | 1/2014 |
| CA | 3079279 A1 | 10/2020 |
| CN | 101166995 A | 4/2008 |
| CN | 103197327 A | 7/2013 |
| CN | 103760573 A | 4/2014 |
| CN | 104200445 A | 12/2014 |
| CN | 104236522 A | 12/2014 |
| CN | 104732085 A | 6/2015 |
| CN | 106338738 A | 1/2017 |
| CN | 106970404 A | 7/2017 |
| CN | 107085626 A | 8/2017 |
| CN | 108196272 A | 6/2018 |
| CN | 108317949 A | 7/2018 |
| CN | 108536003 A | 9/2018 |
| CN | 105629263 B | 4/2019 |
| CN | 107422354 B | 6/2019 |
| CN | 110727002 A | 1/2020 |

(56)         References Cited

FOREIGN PATENT DOCUMENTS

| | | |
|---|---|---|
| CN | 109001382 B | 5/2020 |
| CN | 111272174 A | 6/2020 |
| CN | 111879545 A | 11/2020 |
| CN | 109714421 B | 8/2021 |
| CN | 111624630 B | 2/2022 |
| CN | 114174850 A | 3/2022 |
| CN | 120009933 A | 5/2025 |
| DE | 102017212603 A1 | 1/2019 |
| DE | 102018202223 A1 | 8/2019 |
| EP | 0244091 A2 | 11/1987 |
| EP | 0461557 B1 | 12/1997 |
| EP | 0940945 A2 | 9/1999 |
| EP | 1729145 A1 | 12/2006 |
| EP | 2128841 A1 | 12/2009 |
| EP | 2602752 A1 | 6/2013 |
| EP | 1839070 B2 | 4/2014 |
| EP | 2966477 A1 | 1/2016 |
| EP | 2995975 A1 | 3/2016 |
| EP | 3035080 A1 | 6/2016 |
| EP | 2156214 B1 | 8/2018 |
| EP | 3627188 A1 | 3/2020 |
| EP | 3566021 B1 | 3/2021 |
| EP | 3809208 A1 | 4/2021 |
| EP | 3828595 A1 | 6/2021 |
| EP | 3963352 A1 | 3/2022 |
| KR | 101181990 B1 | 9/2012 |
| KR | 101446427 B1 | 10/2014 |
| KR | 20150098402 A | 8/2015 |
| WO | 02061449 A1 | 8/2002 |
| WO | 2017046914 A1 | 3/2017 |
| WO | 2017070732 A1 | 5/2017 |
| WO | 2018188845 A1 | 10/2018 |
| WO | 2019063645 A1 | 4/2019 |
| WO | 2019126707 A1 | 6/2019 |
| WO | 2020214680 A1 | 10/2020 |
| WO | 2020240307 A1 | 12/2020 |

OTHER PUBLICATIONS

"Geo++ SSR For Network-RTK, PPP and PPP-RTK", https://geopp. de/wp-content/uploads/2020/09/SSR_Flyer_v3.pdf, Sep. 2015.

"IGS State Space Representation (SSR) Format Version 1.00", International GNSS Service (IGS), Oct. 5, 2020.

"Integrity-Navipedia", https://gssc.esa.int/navipedia/index.php/ Integrity, published 2011.

"Navstar GPS Space Segment/Navigation User Segment Interfaces", IS-GPS-200L, 228 pages (Year: 2020), May 14, 2020.

"Phase II of the GNSS Evolutionary Architecture Study", https:// www.faa.gov/about/office_org/headquarters_offices/ato/service_ units/techops/navservices/gnss/library/documents/media/geasphaseii_ final.pdf, Feb. 2010.

"RAIM", GMV, 2011, RAIM.

"Safe Position Augmentation for Real-Time Navigation (SPARTN) Interface Control Document Version 1.8.0", Jan. 2020, Sapcorda Services GmbH.

"Swift Navigation Binary Protocol", Version 3.4.5, Mar. 10, 2021, pp. 1-156.

"Wikipedia (Covariance matrix)", https://en.wikipedia.org/wiki/ Covariance_matrix, downloaded May 2, 2023 (Year: 2023).

Abdel-Hafez, M. F., "A High-Integrity and Efficient GPS Integer Ambiguity Resolution Method", Navigation: Journal of The Institute of Navigation, vol. 50(4), p. 295-310, Winter 2003-2004 (Year: 2004).

Altmayer, Christian , "Cycle Slip Detection and Correction by Means of Integrated Systems", ION Institute of Navigation, Proceedings of the 200 National Technical Meeting of the Institute of Navigation, Abstract, Jan. 26-28, 2000.

Angelo, Joseph , et al., "System and Method for Detecting Outliers in GNSS Obervations", U.S. Appl. No. 18/116,117, filed Mar. 1, 2023.

Berntorp, Karl , et al., "Bayesian Sensor Fusion of GNSS and Camera With Outlier Adaptation for Vehicle Positioning", Mitsubishi Electric Research Laboratories, https://www.merl.com, Aug. 6, 2022.

Bijl, Hildo , et al., "Online sparse Gaussian process regression using FITC and PITC approximations", IFAG-Papers On Line vol. 48, Issue 28, 2015, pp. 703-708 (Year: 2015).

Blanch, Juan , et al., "RAIM with Optimal Integrity and Continuity Allocations Under Multiple Failures", IEEE Transactions on Aerospace and Electronic Systems, vol. 46, No. 3, Jul. 2010.

Boda, Aaron , "Cycle Slip Detection using PVA Kalman Filter", Technical Report • Dec. 2017.

Brack, A. , "Optimal Estimation of a Subset of Integers With Application to GNSS", Artificial Satellites, vol. 51, No. 4—2016 DOI: 10.1515/arsa-2016-0011.

Brocard, Philippe , "Integrity monitoring for mobile users in urban environment", https://tel.archives-ouvertes.fr/tel-01379632/ document, submitted Oct. 11, 2016.

Brocard, Philippe , et al., "System and Method for Bounding a Satellite Positioning Solution Integrity", U.S. Appl. No. 18/537,212, filed Dec. 12, 2023.

Brocard, Philippe , et al., "System and Method for Distributed Integrity Monitoring", U.S. Appl. No. 18/491,167, filed Oct. 20, 2023.

Bruno, Jon , et al., "A realistic simulation framework to evaluate ionospheric tomography", Advances in Space Research 65 (2020) 891-901.

Cassel, Ryan , "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.

Chiu, David S. , et al., "Bierman-Thornton UD Filtering for Double-Differenced Carrier Phase Estimation Accounting for Full Mathematical Correlation", Jan. 2008, ION NTM 2008, pp. 756-762., Jun. 23, 2017 00:00:00.0.

Cole, D.A. , et al., "Locally induced Gaussian processes for large-scale simulation experiments", Stat Comput 31, 33 (2021). https:// doi.org/10.1007/s11222-021-10007-9 (Year: 2021).

Collin, Jussi , et al., "TKT-2546 Methods for Positioning", Tampere University of Technology, 2010, 50 pages.

Davidson, Pavel , et al., "Improved Vehicle Positioning in Urban Environment through Integration of GPS and Low-Cost Inertial Sensors", European Navigation Conference, ENC-GNSSAt: Naples, Italy, May 2009.

Ding, Wei , et al., "Carrier Phase-Based Precise Heading and Pitch Estimation Using a Low-Cost GNSS Receiver", Remote Sens. 2021, 13,3642. https://doi.org/ 10.3390/rs13183642.

Drescher, Ralf , "Fast convergence of Trimble CenterPoint RTX by regional augmentation", Trimble Terrasat GmbJ, Munich, EGU General Assembly 2015, Vienna, Thursday, Apr. 16, 2015.

Erickson, Collin B., et al., "Comparison of Gaussian Process Modeling Software", European Journal of Operational Research 266 (2018) 179-192 (Year: 2018).

Farrell, James L., "Carrier Phase Processing Without Integers", ION 57th Annual Meeting/CIGTF 20th Biennial Guidance Test Symposium, Jun. 11-13, 2001, Albuquerque, NM.

Favey, Etienne , et al., "Dead reckoning fills-in GPS navigation gap", EE Times, Automotive Designline, Aug. 18, 2011.

Feng, Shaun , et al., "Carrier phase-based integrity monitoring for high-accuracy positioning", GPS Solution, Apr. 2009.

Freda, Peirluigi , et al., "Time-differenced carrier phases technique for precise GNSS velocity estimation", GPS Solut, DOI 10.1007/ s10291-014-0425-1, published online Dec. 31, 2014.

Gargiulo, Gianluca, et al., "GNSS Integrity and protection level computation for vehicular applications", Conference: Proceedings of 16th Ka and broadband communications—navigation and earth observation conference, Jan. 2010, https://www.researchgate.net/ publication/239949398_GNSS_Integrity_and_protection_level_ computation_for_vehicular_applications.

Geng, Jianghui , et al., "Toward global instantaneous decimeter-level positioning using tightly coupled multi-constellation andmulti-frequency GNSS", Journal of Geodesy, vol. 92, p. 977-991 (Year: 2019).

(56) References Cited

OTHER PUBLICATIONS

Gratton, Livio , et al., "Carrier Phase Relative RAIM Algorithms and Protection Level Derivation", Journal of Navigation (2010), 63, 215-231, doi: 10.1017/S0373463309990403.

Gunning, Kazuma , et al., "Design and evaluation of integrity algorithms for PPP in kinematic applications", Proceedings of the 31st International Technical Meeting of the Satellite Division of The Institute of Navigation (ION GNSS+ 2018) Sep. 24-28, 2018, Hyatt Regency Miami, Miami, Florida.

Henkel, Patrick , et al., "Joint L-/C-Band Code and Carrier Phase Linear Combinations for Galileo", International Journal of Navigation and Observation, vol. 2008, Article ID 651437, 8 pages.

Hirokawa, Dr. Rui , "Recent Activity of International Standardization for High-Accuracy GNSS Correction Service", Mitsubishi Electric, Jun. 27, 2019.

Huang, Panpan , "Airborne GNSS PPP Based Pseudolite System", School of Civil and Environmental Engineering Faculty of Engineering UNSW. Jun. 2019.

Ibrahim, Hassan E., et al., "A Regional Stochastic Model for NOAA-Based Residual Tropospheric Delay", ION NTM 2008, Jan. 28-30, 2008, San Diego, CA.

Inyurt, Samed , et al., "Ionospheric TEC Forecasting Using Gaussian Process Regression (GPR) and multiple Linear Regression (M LR) in X Turkey", Astrophys Space Sci (2020) 365:99, https://doi .org/10.1007 / s10509-020-03817-2 (Year: 2020).

Karaim, Malek , et al., "GNSS Error Sources", https://www. intechopen.com/books/multifunctional-operation-and-application-of-gps/gnss-error-sources, published Apr. 6, 2018.

Karaim, Malek , et al., "GPS Cycle Slip Detection and Correction at Measurement Level", British Journal of Applied Science & Technology 4(29): 4239-4251, 2014.

Khanafseh, Samer , et al., "GNSS Multipath Error Modeling for Automotive Applications", Abstract only, Proceedings of the 31st International Technical Meeting of the Satellite Division of The Institute of Navigation (ION GNSS+ 2018), Miami, Florida, Sep. 2018, pp. 1573-1589, https://www.ion.org/publications/abstract.cfm? articleID=16107.

Kilic, Cagri , et al., "ZUPT Aided GNSS Factor Graph with Inertial Navigation Integration for Wheeled Robots", Proceedings of the 34th International Technical Meeting of the Satellite Division of The Institute of Navigation (ION GNSS+ 2021) Sep. 20-24, 2021.

Kim, Jungbeom , et al., "A Low-Cost High-Precision Vehicle Navigation System for Urban Environment Using Time Differenced Carrier Phase Measurements", Proceedings of the 2020 International Technical Meeting, 597 ION ITM 2020, San Diego, California, Jan. 21-24, 2020, https://doi.org/10.33012/2020.17164.

Kissai, Ali , et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.

Ko, Jonathan , et al., "GP-UKF: Unscented kalman filters with Gaussian process prediction and observation models", Conference Paper, Dec. 2007, 10.1109/IROS.2007.4399284.

Kim, Donguk , et al., "Modified Kriging Based Double-Difference Tropospheric Correction Interpolation Method for Network RTK User", Proceedings of the 30th International Technical Meeting of the Satellite Division of The Institute of Navigation (ION GNSS+ 2017), Sep. 25-29, 2017, Oregon Convention Center. Portland, Oregon.

Li, Yihe , et al., "Improved PPP Ambiguity Resolution Considering the Stochastic Characteristics of Atmospheric Corrections from Regional Networks", Sensors 2015, 15, 29893-29909; doi:10.3390/ s151229772, www.mdpi.com/journal/sensors, published Nov. 30, 2025.

Li, Xingxing , et al., "Real-time precise point positioning regional augmentation for large GPS reference networks", GPS Solut (2014) 18:61-71, published Jan. 24, 2013.

Sparks, Lawrence , et al., "Estimating ionospheric delay using kriging", Radio Science, vol. 46, RS0D21, doi:10.1029/ 2011RS004667, 2011, published Oct. 27, 2011.

Yang, Lei , et al., "Numerical weather modeling-based slant tropospheric delay estimation and its enhancement by GNSS data", Geo-spatial Information Science, 2013, vol. 16, No. 3, 186-200, http://dx.doi.org/10.1080/10095020.2013.817107, published Aug. 13, 2013.

Thombre, Sarang , et al., "GNSS Threat Monitoring and Reporting: Past, Present, and a Proposed Future", The Journal of Navigation, Dec. 2017, DOI: 10.1017/S0373463317000911, https://www. researchgate.net/publication/321663256.

Titsias, Michael K., "Variational Learning of Inducing Variables in Sparse Gaussian Processes", http://proceedings.mlr.press/v5/titsias09a/ titsias09a.pdf, 2009.

Urquhart, Landon , "An Analysis of Multi-Frequency Carrier Phase Linear Combinations for GNSS", Department of Geodesy and Geomatics Engineering, University of New Brunswick, Technical Report No. 263, Feb. 2009.

Urquhart, Landon , et al., "Innovation: Integrity for safe navigation", https://www.gpsworld.com/innovation-integrity-for-safe-navigation-provided-by-gnss-service/, GPS World, Feb. 12, 2020.

Van Diggelen, Frank, et al., "Google to improve urban GPS accuracy for apps", Dec. 9, 2020, Android Developers Blog.

Van Graas, Frank , et al., "Precise Velocity Estimation Using a Stand-Alone GPS Receiver", Abstract only, Journal of The Institute of Navigation, vol. 51, No. 4, Winter 2004-2005, pp. 283-292, https://www.ion.org/publications/abstract.cfm?articleID=102384.

Verhagen, S. , "The GNSS integer ambiguities: Estimation and validation", Aerospace Engineering, Jan. 31, 2005.

Wang, Yuechen , et al., "Real-time integrity monitoring for a wide area precise positioning system", Satell Navig (2020) 1:24.

Waserman, Eyal , et al., "A Mixed Integer Least-Squares Formulation of the GNSS Snapshot Positioning Problem", https://github. com/eyalw711/snapshot-positioning, Jun. 2, 2021.

Watanabe, Yoko , et al., "Fault-tolerant final approach navigation for a fixed-wing UAV by using long-range stereo camera system", 2020 International Conference on Unmanned Aircraft Systems (ICUAS) Athens, Greece, Sep. 1-4, 2020.

Weiss, Berntrop K., et al., "GNSS Ambiguity Resolution by Adaptive Mixture Kalman Filter", TR2018-103, Jul. 13, 2018.

Wendel, J. , et al., "Time-Differenced Carrier Phase Measurements for Tightly Coupled GPS/INS Integration", 0-7803-9454-2/06/$20. 00/©2006 IEE, Jul. 5, 2006, 2006 IEEE/ION Position, Location, And Navigation Symposium, Date of Conference: Apr. 25-27, 2006.

Won, Dachee , et al., "Performance Improvement of Inertial Navigation System by Using Magnetometer with Vehicle Dynamic Constraints", Hindawi, vol. 2015, published 2015, Article ID 435062, https://doi.org/10.1155/2015/435062, https://www.hindawi.com/ journals/js/2015/435062/.

Wubbena, Gerhard , et al., "PPP-RTK: Precise Point Positioning Using State-Space Representation in RTK Networks", Presented at the 18th International Technical Meeting, ION GNSS-05, Sep. 13-16, 2005, Long Beach, California.

Wubbena, Gerhard , et al., "RTK Networks based on Geo++ GNSMART—Concepts, Implementation, Results", ION GPS 2001, Sep. 11-14, 2001, Salt Lake City, UT.

Xiao, Guorui , "A computationally efficient approach for isolating satellite phase fractional cycle biases based on Kalman filter", 19th EGU General Assembly, EGU2017, proceedings for the conference held Apr. 23-28, 2017 in Vienna., p. 12495.

Yang, Wenhao , et al., "An Improved Relative GNSS Tracking Method Utilizing Single Frequency Receivers", Sensors 2020, 20, 4073; doi:10.3390/s20154073 www.mdpi.com/journal/sensors, 19 pages.

Yang, Y. , "L 1 Backup Navigation for Dual Frequency GPS Receive", Proceedings of the 16th International Technical Meeting of the Satellite Division of The Institute of Navigation (ION GPS/GNSS 2003), p. 1258-1263 (Year: 2003).

Yang, Y. , et al., "L1 Backup Navigation for Dual Frequency GPS Receiver", Proceedings of the 16th International Technical Meeting of the Satellite Division of The Institute of Navigation (ION GPS/GNSS 2003), Portland, OR, Sep. 2003, pp. 1258-1263.

Zair, Salim , et al., "Outlier Detection in GNSS Pseudo-Range/ Doppler Measurements for Robust Localization", Sensors 2016, 16, 580; doi:10.3390/s16040580, www.mdpi.com/journal/sensors.

(56) References Cited

OTHER PUBLICATIONS

Zhu, Ni , et al., "GNSS Position Integrity in Urban Environments: A Review of Literature", IEEE Transactions on Intelligent Transportation Systems, 2018, 17p., 10.1109/TITS.2017.2766768.hal-01709519.

Kuusniemi, Heidi , et al., "GNSS Signal Reliability Testing in Urban and Indoor Environments", Proceedings of NTM 2004 Conference (Session A2), San Diego, CA, Jan. 26-28, 2004, The Institute of Navigation.

Lee, Jae Ho , et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.

Lei, Yu , et al., "Prediction of Navigation Satellite Clock Bias by Gaussian Process Regression", Lecture Notes in Electrical Engineering 342:411-423, Jan. 2015.

Li, T. , et al., "Some remarks on GNSS integer ambiguity validation methods", Survey Review, Dec. 5, 2012, vol. 44, No. 326.

Lim, Cheol-Soon , et al., "Feasibility Study on Integration of SSR Correction into Network RTK to Provide More Robust Service", JPNT 7(4), 295-305 (2018).

Lin, Ming , et al., "Robust Gaussian Process Regression for Real-Time High Precision GPS Signal Enhancement", Applied Data Science Track Paper. KDD '19, Aug. 4-8, 2019, Anchorage, AK, USA (Year: 2019).

Lin, Ming , et al., "Robust Gaussian Process Regression for Real-Time High Precision GPS Signal Enhancement", www.gps.gov/systems/gps/performance/accuracy, Jun. 5, 2019.

Liu, Haiying , et al., "A closed-loop EKF and multi-failure diagnosis approach for cooperative GNSS positioning", Engineering, GPS Solutions, Published 2015.

Madani, Kurosh , et al., "Studies in Computational Intelligence", Revised and Selected Papers of the International Joint Conference, IJCCI 2011, Paris, France, Oct. 24-26, 2011.

Madrid, Navarro , et al., "New Approach for Integrity Bounds Computation Applied to Advanced Precise Positioning Applications", Proceedings of the 28th International Technical Meeting of the Satellite Division of The Institute of Navigation (ION GNSS+ 2015) Sep. 14-18, 2015, Tampa Convention Center, Tampa, Florida.

Maybeck, Peter S., "Stochastic models, estimation, and control", vol. 1, Academic Press, p. 1-16, 133-134, 169-176, 203-220, 275-276, 289-306, 341-362, 411-423 (Year: 1979).

Meng, Xiaoli , et al., "A Robust Vehicle Localization Approach Based on GNSS/IMU/DMI/LiDAR Sensor Fusion for Autonomous Vehicles", Sensors, 2017, 17, 2140.

Mobarak, Jason , et al., "System and Method for GNSS Correction Transmission", U.S. Appl. No. 18/244,567, filed Sep. 11, 2023.

Odijk, Dennis , et al., "On the estimability of parameters in undifferenced, uncombined GNSS network and PPP-RTK user models by means of S-system theory", Journal of Geodesy, Nov. 2015.

Ogaja, Clement A., "Applied GPS for Engineers and Project Managers", ASCE Press, p. 177-179 (Year: 2011).

Parkins, Alexander James, "Performance of precise marine positioning using future modernised global satellite positioning systems and a novel partial ambiguity resolution technique Department of Civil", Environmental and Geomatic Engineering, Aug. 2009.

Parkins, Alex , et al., "System and Method for GNSS Correction Monitoring", U.S. Appl. No. 18/503,662, filed Nov. 7, 2023.

Peng, Hao , et al., "Covariance Fusion Strategy of Gaussian Processes Covariance and Orbital Prediction Uncertainty", Conference: AAS/AIAA Astrodynamics Specialist Conference, Portland, ME, Aug. 2019.

Pervan, Boris , et al., "Shaping Aviation Integrity Two RAIMs for Safety", GPS World The Business and Technology of Global Navigation and Positioning, Apr. 1, 2008.

Petovello, Mark , "How does a GNSS receiver estimate velocity?", Inside GNSS, Mar./Apr. 2015, www.insidegnss.com.

Phelts, R. Eric, et al., "Innovation: Improving ARAIM, An approach using precise point positioning", GPS World, Jun. 13, 2020, https://www.gpsworld.com/innovation-improving-araim/.

Pongsakornsathien, Nichakorn , et al., "A Performance-Based Airspace Model for Unmanned Aircraft Systems Traffic Management", Aerospace, vol. 7(154), 26 pages (Year: 2020).

Pullen, Sam , "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.

Quinonero-Candel, Joaquin , et al., "A Unifying View of Sparse Approximate Gaussian Progress Regression", Journal of Machine Learning Research 6 (2005) 1939-1959. (Year: 2005).

Rasmussen, C.E. , et al., "Gaussian Processes for Machine Learning", MIT Press, 2006, ISBN 026218253X. c 2006 Massachusetts Institute of Technology, (Year: 2006).

Reimer, Christian , et al., "System and Method for Fusing Sensor and Satellite Measurements for Positioning Determination", U.S. Appl. No. 18/115,963, filed Mar. 1, 2023.

Richardson, Julian , "Flexible Generation of Kalman Filter Code", NASA Technical Reports Server (NTRS), Document ID 20060019115, Jan. 1, 2006.

Rodriguez-Solano, Carlos , et al., "Protection Level of the Trimble RTX Positioning Engine for Autonomous Applications", Proceedings of the 34th International Technical Meeting of the Satellite Division of The Institute of Navigation (ION GNSS+ 2021), Sep. 20-24, 2021.

Rothacher, M. , et al., "ANTEX: The Antenna Exchange Format, Version 1.4", Sep. 15, 2010, IGC International GNSS Service, https://kb.igs.org/hc/en-us/articles/216104678-ANTEX-format-description.

Roysdon, Paul F., et al., "GPS-INS Outlier Detection & Elimination using a Sliding Window Filter", 2017 American Control Conference (ACC), May 24-26, 2017, Seattle, WA, USA.

Satirapod, Chalermhon , "Improving the GPS Data Processing Algorithm for Precise Static Relative Positioning", School of Surveying and Spatial Information Systems The University of New South Wales. Jan. 2002.

Schmid, R. , et al., "Estimation of elevation-dependent satellite antenna phase center variations of GPS satellites", Journal of Geodesy (2003) 77: 440-446, May 19, 2003, DOI 10.1007/s00190-003-0339-0.

Schmid, Ralf , et al., "From Relative Absolute Antenna Phase Center Corrections", Conference: IGS Workshop and Symposium 2004.

Schmid, Ralf , "How to Use IGS Antenna Phase Center Corrections", GPS World Tech Talk, Feb. 3, 2010.

Schmitz, Martin , "RTCM State Space Representation Messages, Status and Plans", PPP-RTK & Open Standards Symposium, Mar. 12-13, 2012, Frankfurt, Germany.

Shapiro, Larry S., et al., "Rejecting Outliers and Estimating Errors in an Orthogonal-Regression Framework", Phil. Trans. R. Soc. Load. A (1995)350, 407-439. (Year: 1995).

Skog, Isaac , et al., "A Low-Cost GPS Aided Inertial Navigation System for Vehicle Applications", 2005 13th European Signal Processing Conference, Sep. 4-8, 2005.

Sleewaegen, Jean-Marie , et al., "Galileo E5b Rover Receiving E5a Corrections? No Problem!", 32nd International Technical Meeting of the Satellite Division of the Institute of Navigation (ION GNSS+ 2019), Miami, Florida, Sep. 16-20, 2019.

Smolyakov, Ivan , et al., "System and Method for Determining GNSS Corrections", U.S. Appl. No. 18/241,542, filed Sep. 1, 2023.

Snelson, Edward , et al., "Sparse Gaussian Process using Pseudo-inputs", NIPS'05: Proceedings of the 18th International Conference on Neural Information Processing Systems, Dec. 2005, pp. 1257-1264.

Subirana, J. Sanz, et al., "Carrier Phase Cycle-Slip Detection—Navipedia", https://gssc.esa.int/navipedia/index.php/Carrier_Phase_Cycle-Slip_Detection, published 2011.

Subirana, J. S., "Combination of GNSS Measurements, Navipedia", https://gssc.esa.int/navipedia/index.php?title=Combination_of_GNSS_Measurements (Year: 2011).

(56) References Cited

OTHER PUBLICATIONS

Takasu, Tomoji , et al., "ION GNSS 2008 abstract submission Cycle slip detection and fixing by MEMS IMU/GPS integration for mobile environment RTK-GPS", Tokyo University of Marine Science and Technology, ION GNSS 2008, abstract submission.

Takasu, Tomojii , et al., "Kalman-Filter-Based Integer Ambiguity Resolution Strategy for Long-Baseline RTK with Ionosphere and Troposphere Estimation", Tokyo University of Marine Science and Technology, Japan, revised Oct. 3, 2010—11 pages.

Takenaka , et al., "Geolocation Correction for Geostationary Satellite Observations by a Phase-Only Correlation Method Using a Visible Channe", MPDI, Aug. 1, 2020, retrieved on Oct. 3, 2023. Retrieved from the internet <URL: http://www.mdpi.com/2072-4292/12/15/2472>.

Tanedo, Flip , "Notes on non-holonomic constraints", For P3318, Spring 2013, https://www.physics.uci.edu/~tanedo/files/teaching/P3318S13/Sec_05_nonholonomic.pdf.

Teunissen, P.J.G. , "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.

Teunissen, P.J.G. , "On the GPS widelane and its decorrelating property", Delft Geodetic Computing Centre, Journal of Geodesy (1997) 71: 577-587.

Teunissen, P.J.G. , "The least-squares ambiguity decorrelation adjustment: its performance on short GPS baselines and short observation spans", Journal of Geodesy, (1997) 71: 589-602, 14 pages.

Wang, Min , et al., "GPS Un-Differenced Ambiguity Resolution and Validation", Proceedings of the 19th International Technical Meeting of the Satellite Division of The Institute of Navigation (ION GNSS 2006), p. 292-300 (Year: 2006).

* cited by examiner

SYSTEM AND METHOD FOR GAUSSIAN PROCESS ENHANCED GNSS CORRECTIONS GENERATION

CROSS-REFERENCE TO RELATED APPLICATIONS

This application is a divisional of U.S. patent application Ser. No. 17/554,397 filed 17 Dec. 2021, which is a continuation-in-part of U.S. patent application Ser. No. 16/983,706 now U.S. Pat. No. 11,237,276 filed 3 Aug. 2020, which claims the benefit of U.S. Provisional Application No. 62/881,520 filed 1 Aug. 2019, each of which is incorporated in its entirety by this reference.

TECHNICAL FIELD

This invention relates generally to the satellite positioning field, and more specifically to a new and useful system and method in the satellite positioning field.

BACKGROUND

Being able to perform high precision satellite positioning is important for a wide variety of applications. Unfortunately, current GNSS solutions are often either inaccurate or require processor power beyond the capabilities of inexpensive hardware (either locally or in the cloud). A number of solutions have been proposed to address this problem, including Network Real Time Kinematic (Network RTK) satellite positioning. Unfortunately, in traditional methods of Network RTK, the input parameter space increases nonlinearly with the size of the network, making it very computationally costly to increase the network size (and thus coverage area and/or positioning accuracy). However, other models may suffer from issues relating to how model parameters are updated (typically via Kalman filter or least-squares). Therefore, there is the need in the satellite positioning field to create a new and useful system and method. This invention provides such new and useful system and method.

DESCRIPTION OF THE INVENTION EMBODIMENTS

The following description of the invention embodiments of the invention is not intended to limit the invention to these invention embodiments, but rather to enable any person skilled in the art to make and use this invention.

2.3 Overview

Figure 1:
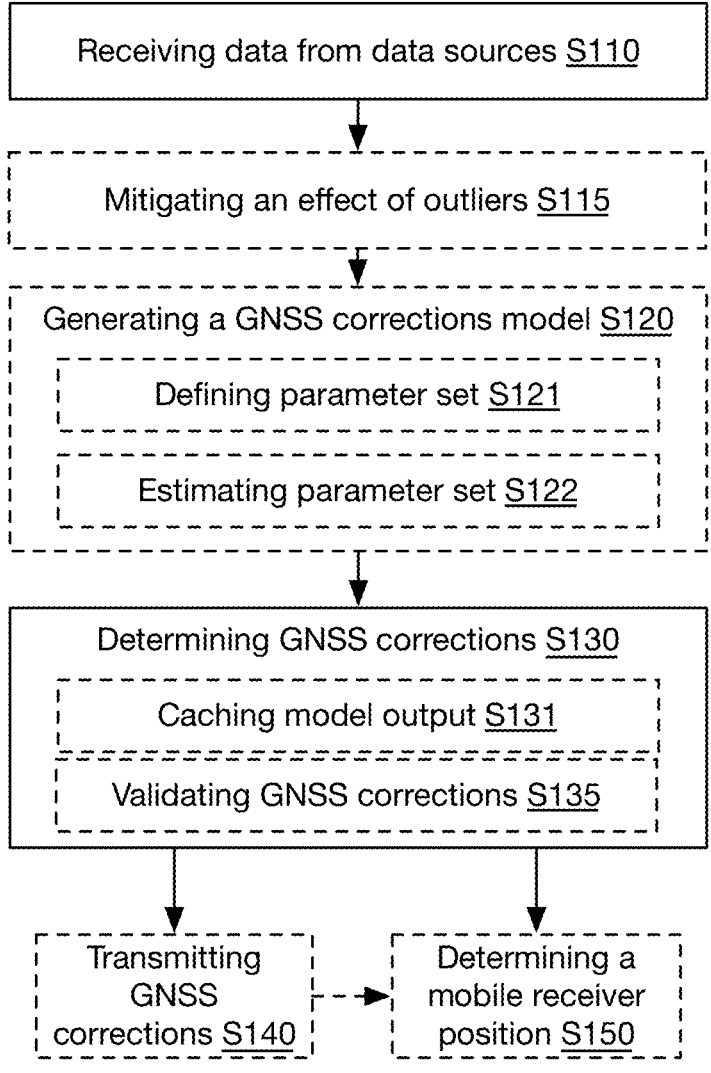
FIG. 1 is a chart representation of a method of an invention embodiment.

As shown in FIG. 1, a method for generating GNSS corrections can include: receiving data S110 and determining GNSS corrections S130. The method can optionally include: mitigating an effect of outliers in the data S115, determining a GNSS corrections model S120, transmitting the GNSS corrections S140, determining a mobile receiver position S150, and/or any suitable steps. The data preferably corresponds to a set of satellite observations (e.g., pseudorange, carrier phase, ephemeris, code data, etc.), corresponding to one or more satellites of one or more satellite constellations, detected at a set of reference stations, detected at other satellites (e.g., low earth orbit satellites), and/or detected at any suitable detection site. However, the data can additionally or alternatively include sensor data, weather conditions (e.g., temperature, humidity, wind, etc.), and/or any suitable data.

Figure 4:
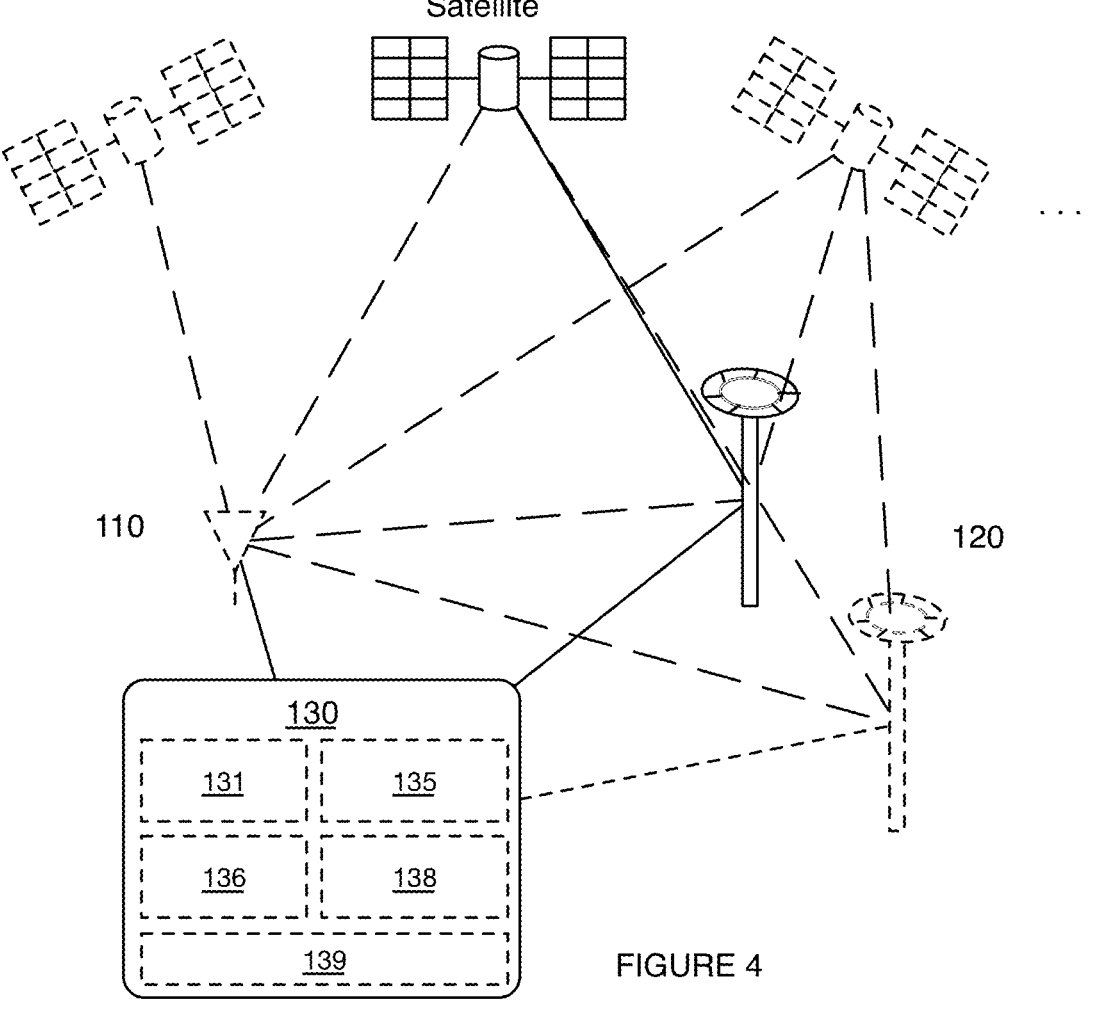
FIG. 4 is a schematic representation of an embodiment of the system.
Figure 5:
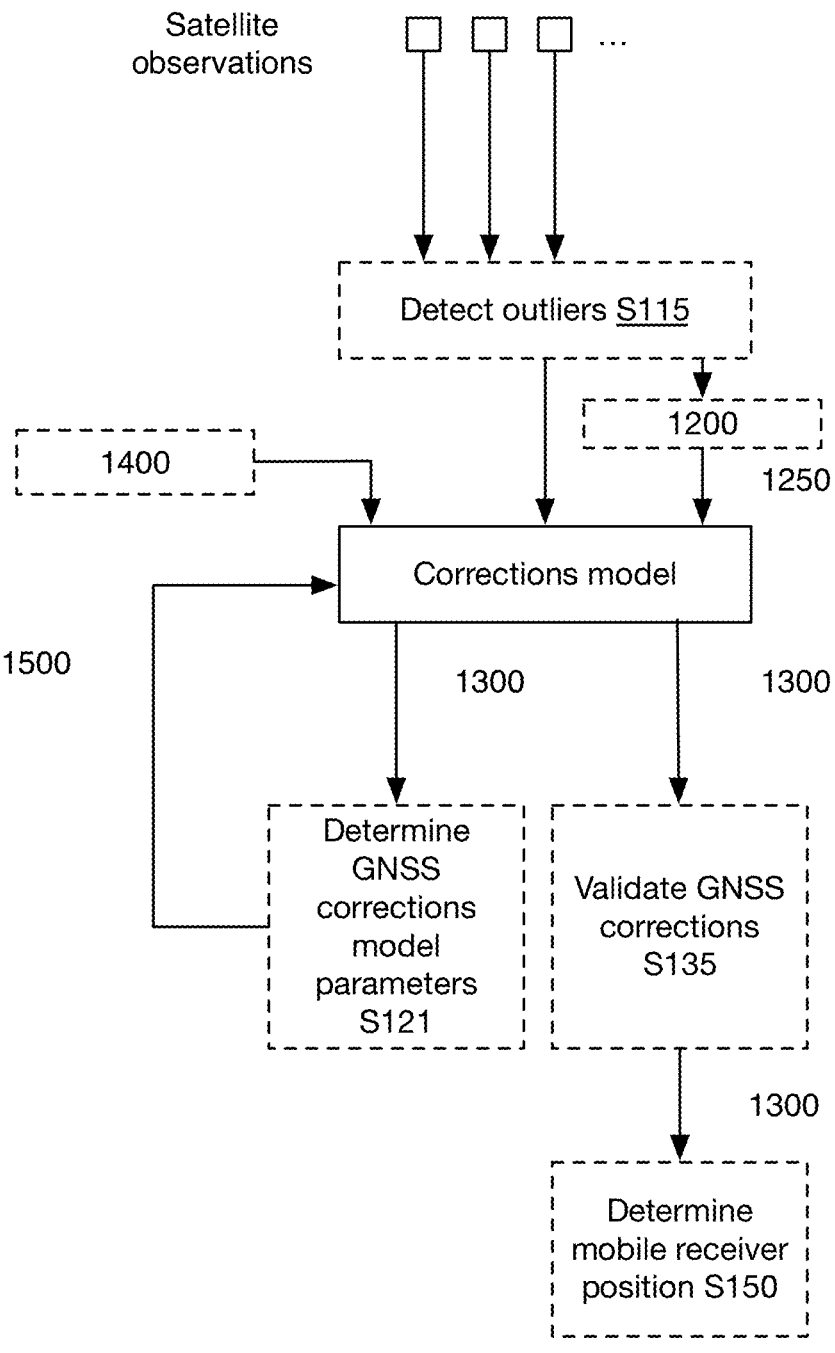
FIG. 5 is a schematic representation of an example of the method.

As shown in FIG. 4, a system for generating GNSS corrections can include: one or more mobile receivers, a set of reference stations, and a computing system. The system can optionally include sensors. The computing system can include: a corrections modeler 131, a validator 138, a querier 135, a stitcher 136, a corrections generator 137, and/or any suitable components.

The system and/or method preferably function to determine GNSS corrections, which can be used to correct satellite observations and/or mobile receiver positions to increase the accuracy and/or integrity of a mobile receiver position.

Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (TOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system.

In a specific example, the system and/or method can include receiving a set of satellite observations corresponding to one or more satellites associated with one or more satellite constellation; generating a set of GNSS corrections using a GNSS corrections model, wherein the GNSS corrections model comprises a Gaussian process, wherein inputs to the GNSS corrections model comprise undifferenced and uncombined satellite observations from the set of satellite observations; wherein the set of GNSS corrections are operable to correct a position estimate for a mobile receiver.

1.2 Traditional GNSS, PPP, and RTK

Traditional satellite positioning systems (e.g., standard GNSS) work by attempting to align a local copy (at a receiver) of a pseudorandom binary sequence with a satellite-transmitted copy of the same sequence; because the satellite is far from the receiver, the signal transmitted by the satellite is delayed. By delaying the local copy of the sequence to match up with the satellite-transmitted copy, the time it takes the signal to travel from the satellite to the receiver can be found, which can in turn be used to calculate the distance between the satellite and receiver. By performing this process for multiple satellites (typically four or more), a position of the receiver relative to the satellites can be found, which can in turn be used to find the position in a particular geographic coordinate system (e.g., latitude, longitude, and elevation). Typical GNSS systems can achieve at best 2 m accuracy in positioning.

For many applications (e.g., guidance for human-carrying autonomous vehicles/drones/agricultural equipment, GPS/GNSS research, surveying), this level of accuracy is woefully inadequate. In response, two position correction algorithms have been developed: precise point positioning (PPP) and real time kinematic (RTK).

Instead of solely using the positioning code broadcast by satellites, PPP and RTK also make use of satellite signal carrier phase to determine the position. While much higher accuracy is possible using carrier phase data, accurately determining the position of a mobile receiver (e.g., the receiver for which position is to be calculated) requires accounting for a number of potential sources of error. Further, carrier phase measurements are ambiguous; because the carrier signal is uniform, it may not be possible to differentiate between a phase shift of $\varphi$ and $2\pi N + \varphi$ using phase measurements alone, where N is an integer. For example, it may be difficult to determine the difference between a phase shift of $\pi$ radians and a phase shift of $3\pi$ radians (or $-\pi$, $5\pi$, etc.).

PPP attempts to solve this issue by explicitly modeling the error present in mobile receiver phase and code measurements. Some errors are global or nearly global (e.g., satellite orbit and clock errors); for these errors, PPP typically uses correction data with highly accurate measurements. However, for local errors (e.g., error that are substantially dependent on mobile receiver location), PPP is only capable of very rough modeling. Fortunately, many local errors change slowly in time; resultantly, PPP can achieve high accuracy with only a single receiver, but may require a long convergence time to precisely determine local errors. As the terms are used in the present application, "global error" refers to any error that does not vary substantially across multiple reference stations within a region, while "local error" refers to error that does vary substantially across multiple reference stations (because the error is specific to a reference station and/or because the error varies substantially over position within the region). As this error pertains to positioning, such errors may also be referred to as "global positioning error" and "local positioning error".

RTK avoids a large majority of the modeling present in PPP by use of GNSS reference stations (with precisely known locations); since a reference station is local to the mobile receiver, differencing the reference station and mobile receiver signals can result in greatly reduced error. The result is that RTK solutions can converge much more quickly than PPP solutions (and without the high accuracy global corrections data needed by PPP). However, RTK solutions require the presence of base stations near a mobile receiver.

Recently, correction generations systems have been developed that navigate the tradeoffs of PPP and RTK, such as the system of U.S. patent application Ser. No. 16/195,427 now U.S. Pat. No. 10,473,790, the entirety of which is incorporated by this reference.

In such systems, flexibility in the form of corrections data is an inherent and distinguishing aspect over traditional position correction systems. Rather than attempting to generate corrections solely from a small set of high-quality global reference stations (as in PPP) or by comparing data in mobile receiver/reference station pairs (as in RTK), such systems collect data from reference stations (and/or other data sources), and instead of (or in addition to) applying this data directly to generate connections, the data is used to generate correction models. Output of these models are then passed to a correction generator, which can use said output to generate correction data in any form. Further, the correction generator may cache and/or spatially interpolate corrections data to provide high quality corrections to mobile receivers regardless of correction capability (e.g., whether the receiver can process RTK/PPP corrections) and location of individual base stations.

By operating in this manner, such systems may provide a set of corrections that (while usable with PPP receivers) suffers from little of PPP's long convergence time issues, with solution complexity scaling directly with the number of reference stations N (unlike RTK, in which solution complexity scales at least with the number of possible pairs; i.e., $N^2$. In fact, many current solutions scale with $N^3$ or worse). Further, since corrections are preferably calculated using local correction models that may depend on any number of single reference stations (rather than specific reference station pairs), corrections are substantially more robust to loss of a base station.

Further, the flexible nature of the such systems enables some functions (such as spatial interpolation and caching) to be performed much more generally than would be possible with RTK; while the concept of a "virtual reference station" is known within RTK (also referred to as a "pseudo reference station"), virtual reference stations typically involve the interpolation of RTK corrections data in real time (and, as discussed before, error correction scales in complexity with $N^2$). In contrast, interpolation in such systems can be limited to specific aspects of global and/or local corrections models, providing more robustness to error and better insight as to error causes. Further, unlike RTK, which requires real-time corrections data, model-based systems may cache or otherwise retain model parameters even when data is limited (e.g., when a reference station suddenly becomes unavailable).

In such a model-based system, it is of course necessary to update models with time (as the effects that affect GNSS positioning are themselves time-variant). Traditionally, models may be updated using a Kalman filter.

A Kalman Filter can be used to estimate the state of a system at time index k ($x_k$—generally referred to as a state vector) by relating x to an observation vector z at time index k as well as to the state vector at the previous time index ($x_{k-1}$) as follows:

$$z_k = H_k x_k + v_k$$

$$x_k = \Phi_{k-1} x_{k-1} + w_{k-1}$$

where $v_k$ is observation noise (zero mean and with known covariance), $H_k$ is the observation model that maps the true state space into the observed space, $w_{k-1}$ is process noise (also zero mean and with known covariance) and $\Phi_{k-1}$ is the transition model that maps true state at time k−1 to true state at time k. In the case of updating a positioning corrections generation model, the state vector may contain parameters of the model (and the observation vector includes the data used to estimate those parameters—for example, pseudo-range, phase, and position data of reference stations).

An example of a state vector is as follows:

$$x_k = \left[ p_x, p_y, p_z, dt, b_f^P, b_f^L, N_f^s \right]$$

where $p_x$, $p_y$, $p_z$ represent position estimates in cartesian form, dt represent station clock error, b represents bias per frequency (both for pseudorange P and carrier phase L), and $N_f^s$ represents ambiguities (for each frequency f and satellite-device pair s). The state vector may additionally or alternatively contain terms for ionosphere, troposphere, satellite clock and bias terms, and other dynamics (e.g., velocity, acceleration, angular velocity, etc.).

However, the inventors have discovered that Kalman filters, when used to model undifferenced and uncombined networks, can have a number of drawbacks. For example, since the Kalman filter updates the state vector at each time step, if some parameters change on very different timescales than others (e.g., clock biases may change more often than ionospheric delays), the Kalman filter may become (erroneously) overly biased toward past results for the slowly changing parameters. Further, the Kalman filter may have issues in modeling parameters that are constant in time (e.g., integer phase ambiguity) as the filter generally requires non-zero process noise to operate correctly. Another issue is that Kalman filters generally require keeping track of the state of a model; this becomes problematic when dealing with spatial fields (because it would likely require keeping track of a grid of values for the field, greatly increasing the size of the problem).

The system and method of this application are directed to novel techniques implementing Gaussian processes to update positioning corrections generation models. Such techniques may be used to more accurately model GNSS corrections parameters, which may in turn result in more accurate satellite positioning for mobile receivers utilizing said corrections. Gaussian processes may provide a number of advantages over Kalman filters in some implementations of GNSS corrections generations. For example, Gaussian processes may, via the "kernel trick" (note that this is a term of art), bypass direct computation of a model's state, allowing for reduced computational complexity in many implementations compared to a Kalman filter approach.

1.3 Differences Between Gaussian Processes and Kalman Filters

The key differentiator between something like Least Squares or a Kalman Filter and Gaussian Process is the use of a kernel (or covariance) function, $k(x_i, x_j) = cov[y_i, y_j]$, which encodes the relationship between all observations where $y_i$ and $y_j$ are observations (typically pseudorange or carrier phase) corresponding to two locations (or features) given by $x_i$ and $x_j$. This kernel function is used to place a multivariate Gaussian prior, $f(x)N(0,K_{yy})$, on the function values, f(x), which could produce the observations, y, where f(x) is a vector of the function values at the training locations $[f(x_0), \ldots, f(x_n)]$ and the matrix $K_{yy}$ has elements $[KK_{yy}]_{ij} = k(x_i, x_j)$. We can then use this framework to make predictions for some new locations $x_*$ by asking for the distribution of functions at the prediction locations conditional on the observations, $$[f(x_*)|f(x) = y] \sim N\left(K_{*y}K_{yy}^{-1}y, K_{**} - K_{*y}K_{yy}^{-1}K_{y*}\right).$$

Unlike Kalman Filters, Gaussian processes do not require a state vector and in turn do not require a process or observation model. Further, all observations may be taken into account simultaneously. Instead of defining process and observation models, a Gaussian process is defined by specifying a covariance function which typically (though not always) describes how any two observations, $z_i$ and $z_j$ relate to each other.

One of the advantages to utilizing the Gaussian process is that, by choosing a parameter set across time, the time variance of various parameters can be modeled at explicitly set timescales. While a Kalman filter will provide the state of some parameter at time step k based on priors and a set of update data, the Gaussian process can be used to model the state of the same parameter at multiple time steps simultaneously.

So, for example, if a Kalman filter includes both an ionospheric delay term (which can change relatively slowly) and a clock error term (which can change more rapidly), the Kalman filter must be run at a rate appropriate to capture changes in the clock error term. This rate may be both unnecessarily high to model the ionospheric delay term and may result in the ionospheric delay model becoming biased toward initial inputs.

In contrast, the Gaussian process could explicitly model the set of parameters across time. For example, if data is available for timesteps from 0 to k, the Gaussian process could fit parameters for $\epsilon_c$ (clock error) at each time step $\{\epsilon_{c0}, \epsilon_{c1}, \ldots, \epsilon_{ck-1}, \epsilon_{ck}\}$ and ionospheric delay I at a subset of time steps (e.g., $\{I_0, I_{100}, \ldots, I_{k-100}, I_k\}$. Furthermore, Gaussian processes do not necessarily include a Markov assumption, which allows a Gaussian process to model smooth processes (e.g., smooth errors) better than a Kalman filter, implicitly capture strong correlations between errors, and/or improve outlier detection and integrity Relatedly, Gaussian processes may be used to explicitly model a parameter as time invariant, whereas Kalman filters require some amount of process noise (typically, for a time invariant parameter, Kalman filters are configured with very small but non-zero process noise).

Note that in modeling Gaussian processes, the covariance between parameters is typically specified. So, for example, for a set of three parameters, nine covariance terms are needed (including identity terms—note that some of these terms may be identical).

2. System

The system preferably uses a set of data collected by one or more data sources 121. Data sources can include: mobile receivers, sensors (e.g., located onboard the receiver, the external system, the reference stations, etc.), databases, satellites, reference stations, and/or any other suitable data source. Examples of data that can be used include: satellite observations, sensor observations, and/or any other suitable data.

The mobile receiver 110 preferably functions to receive a set of satellite observations (e.g., satellite signals such as carrier phase and satellite code) from one or more satellites. In variants, the mobile receiver can determine the location of the mobile receiver (and/or external system) based on the satellite observations. The mobile receiver is preferably in communication with the computing system. However, the mobile receiver can be integrated with the computing system, and/or the mobile receiver and computing system can be arranged in any suitable manner. The mobile receiver is preferably a stand-alone device (e.g., a GNSS receiver, antenna). However, the mobile receiver can be integrated into an external system (e.g., be a component of an automobile, aero vehicle, nautical vehicle, mobile device, a satellite, etc.), can be a user device (e.g., smart phone, laptop, cell phone, smart watch, etc.), and/or can be configured in any suitable manner.

The set of satellite observations 125 can include orbital data (e.g., ephemeris), timestamp, code data, carrier phase data, pseudocode data, and/or any suitable data. The set of satellite observations preferably includes satellite observations corresponding to satellites from a plurality of satellite constellations (e.g., Global Positioning System (GPS), GLObal Navigation Satellite System (GLONASS), BeiDou navigation satellite System (BDS), Galileo, etc.). However, the set of satellite observations can correspond to satellites from a single satellite constellation, can include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data.

In variants of the system including more than one mobile receiver, each mobile receiver can be configured to receive satellite observations corresponding to a satellite constellation, to a carrier frequency (e.g., the L1, L2, L5, E1, E5a, E5b, E5ab, E6, G1, G2, G3, B1, B2, B3, LEX, etc. frequencies), and/or corresponding to any suitable source.

The reference station(s) 121 preferably function to receive a set of satellite observations (e.g., reference station satellite observations) and transmit the reference station satellite observations to the computing system (and/or to the mobile receiver). The satellite observations from the reference station(s) can be used to determine corrections (e.g., local and/or global corrections such as to account for atmospheric effects, to account for clock errors, etc.) to the set of satellite observations. Each reference station is preferably communicably coupled to the computing system. However, the reference station can include the computing system and/or be coupled to the computing system in any suitable manner. The reference stations can be in communication with the mobile receiver. The reference stations are preferably public reference stations, but can additionally or alternatively be private reference stations or any other suitable reference stations. The reference station(s) are preferably located within about 500 km of the mobile receivers, but the distance between the reference stations and the mobile receiver can be any distance.

The reference station satellite observations can correspond to the same and/or a different set of satellites as the set of satellite observations received by the mobile receiver. However, the reference station satellite observations can correspond to any suitable satellite observations.

The location (e.g., position) of the reference station(s) is preferably known to a high degree of accuracy (e.g., less than 1 mm, 1 cm, 1 dm, 1 m, etc. of uncertainty in the location of the reference station). The location of the reference station(s) can be static and/or dynamic. Reference station location is preferably the location of the antenna used to receive satellite signals, however, the reference station location can be any suitable location. Reference station location can be determined, for example, by using a predetermined number of receivers arranged around the reference station at vertical and horizontal reference points. Note that while reference stations are preferably fixed in location, they may additionally or alternatively be mobile. Station position is preferably re-determined to high accuracy before moved reference stations re-start providing data. However, additionally or alternatively, reference stations may provide data before location re-determination (for example, for use in attitude estimation; alternatively, data may be provided but not used). As another alternative, reference stations may not provide absolute location data; for example, absolute location data of the reference station may not be needed for applications including attitude estimation. Note that fixed reference stations may, over time, "self-survey" their own positions to a reasonably high degree of accuracy.

Reference stations preferably provide data for multiple satellite signals and the location of the reference station via the internet, but can additionally or alternatively provide data by any other suitable method (e.g., transmission by UHF-band radio modem). Reference station data is preferably made available directly to the method, but may additionally or alternatively be processed or aggregated before being made available to the method 100.

Reference stations preferably have one or more satellite receivers and generate corrections based on those receivers. The number and quality of satellite receivers used by a reference station (or other factors, like antenna type/size/location) may determine the accuracy of reference station data. Reference stations (or other sources of reference station data; e.g., a reference source that creates correction data from multiple reference stations) may be ordered or grouped by reference station quality (e.g., accuracy of corrections) and/or locality (e.g., if corrections are desired for a particular mobile receiver, reference stations may be ordered or grouped by distance to that receiver). The reference station satellite receivers can be the same as and/or different from the satellite receivers of the mobile receiver.

The computing system 130 preferably functions to process the data (e.g., satellite observations) from the data sources (e.g., receiver, reference stations, etc.). The computing system can: aggregate the data (e.g., combine the receiver satellite observations, reference station satellite observations, and sensor data; reorganize the receiver satellite observations, reference station satellite observations, and sensor data such as based on the time stamp, time of transmission, time of receipt, etc.; etc.), filter the data (e.g., to calculate state vectors, ambiguities such as phase ambiguities, etc. associated with the data), calculate the receiver position (e.g., based on ambiguities), correct the data (e.g., correct the satellite observations for clock errors, hardware bias, atmospheric effects, cycle slips, etc.), generate corrections (e.g., global corrections, atmospheric corrections, etc.), and/or can process the data in any suitable manner. The computing system can be local (e.g., on-board the external system, integrated in a receiver, integrated with a reference station, etc.), remote (e.g., cloud computing, server, networked, etc.), and/or distributed (e.g., between a remote and local computing system).

The GNSS corrections 1300 are preferably used to correct one or more satellite observations. The GNSS corrections can correspond to individual satellites, sets of satellites, satellite constellations, satellite frequencies, every satellite, reference stations, and/or to any data source. For example, the GNSS corrections can be used to correct the satellite observations for atmospheric effects (e.g., ionosphere delays, troposphere delays, ionosphere gradients, etc.), global effects (e.g., hardware biases, orbit errors, clock errors, etc.), local effect (e.g., receiver hardware bias, receiver clock errors, multipath, integer ambiguities, etc.), and/or any effects. The GNSS corrections can correspond to RTK corrections, PPP corrections, PPP-RTK corrections, SBAS corrections, and/or any suitable corrections. The GNSS corrections can be updated (e.g., at a predetermined time such as based on the type of correction, the intended application, the external system, the target receiver position accuracy, target receiver position integrity, etc.) and/or fixed. The GNSS corrections can be updated at predetermined times (e.g., 1 s, 5 s, 10 s, 30 s, 60 s, 2 min, 5 min, 10 min, 20 min, 30 min, 60 min, 2 hr, 4 hr, 8 hr, 12 hr, 24 hr, etc.), responsive to a trigger (e.g., change in weather, change in temperature, change in mobile receiver position, change in satellites in view of the receiver, etc.), manually (e.g., responsive to a user request for updated corrections), and/or with any suitable timing. The GNSS corrections can be associated with a validity period, wherein the GNSS corrections can be invalid outside of the validity period (e.g., and must be refreshed), or permanently valid.

In variants, the GNSS corrections can be generated in batches. The batches can correspond to temporal batches (e.g., a set of satellite observations received within a predetermined time), spatial batches (e.g., all satellite observations received within a predetermined area such as at a single reference station, at a cluster of reference stations, etc.), and/or any suitable batches. Each batch preferably includes at least 1,000 satellite observations (and/or other data sets) such as about 3,000; 5,000; 7,500; 10,000; 15,000; 20,000; 25,000; 30,000; 35,000; 50,000; 100,000; 150,000; 200,000; 250,000; 500,000; 1,000,000; 1,000-1,000,000 satellite observations, etc. However, each batch can include less than 1,000 satellite observations or more than 1,000,000 satellite observations. Each new batch is preferably used to update the GNSS corrections. However, each batch can be used to generate a different GNSS correction, generate a new GNSS correction (e.g., independent of prior GNSS corrections), and/or can be otherwise used.

However, the GNSS corrections can be generated continuously (e.g., as additional satellite observations are observed, they are included in the model, as they are requested, etc.) and/or in any manner.

The GNSS corrections are preferably determined using a Gaussian process. However, one or more GNSS correction of the GNSS correction set can be generated using particle filters (e.g., Kalman filter, extended Kalman filters, etc.), using models, as disclosed in U.S. patent application Ser. No. 16/589,932 now U.S. Pat. No. 11,061,141 titled 'SYSTEMS AND METHODS FOR DISTRIBUTED DENSE NETWORK PROCESSING OF SATELLITE POSITIONING DATA' filed 1 Oct. 2019, herein incorporated in its entirety by this reference, and/or in any manner. In an embodiment, the GNSS corrections can be generated without using a Kalman filter. However, one or more GNSS correction of the GNSS corrections set can be generated using a Kalman filter and/or in any manner.

The computing system is preferably communicably coupled to the mobile receiver(s) and to the reference station(s), but the computing system can be in communication with any suitable components.

In variants, the computing system can include a corrections modeler 131, a querier 135, a stitcher 136, a corrections generator 137, a validator 138, and/or any suitable modules or components. In specific examples, the system can include one or more components as described in U.S. application Ser. No. 16/817,196 now U.S. Pat. No. 11,035, 961 filed 12 Mar. 2020, U.S. application Ser. No. 16/865,077 now U.S. Pat. No. 10,809,388 filed 1 May 2020, and/or U.S. application Ser. No. 16/589,932 now U.S. Pat. No. 11,061, 141, filed 1 Oct. 2019, each of which is incorporated herein its entirety by this reference, or otherwise configured.

The GNSS corrections modeler 131 preferably functions to determine the GNSS corrections (and/or the metadata). The system can include one or more corrections modelers 131 (e.g., different modelers for different errors, different modelers for the same error, the same modeler for multiple errors, etc.). The correction modeler preferably determines the GNSS corrections using the reference station satellite observations, but can additionally or alternatively determine the GNSS corrections based on errors and/or delays estimated using PPP filters (e.g., ionosphere delays, troposphere delays, etc.) and/or based on any data. The correction modeler preferably determines the GNSS corrections using undifferenced and/or uncombined GNSS corrections. However, the correction modeler can additionally or alternatively determine the GNSS corrections using single differenced (e.g., between satellite observations received at the mobile receiver, between satellite observations received at the mobile receiver and a satellite observations received at a reference station, etc.), double differenced (e.g., between satellite observations received at the mobile receiver and the reference station, between satellite observations received at the mobile receiver and different reference stations), triple differenced (e.g., between satellite observations received during a first epoch at the mobile receiver and the reference station and satellite observations received during a second epoch at the mobile receiver and the reference station), and/or otherwise combined or differenced satellite observations.

Each correction model is preferably valid for a predetermined geographic extent (e.g., associated with the respective error; be predetermined, determined based on the geographic extent of the inputs, etc.), but can additionally or alternatively be valid for the entire globe, a timeframe, and/or any other suitable set of parameters. The corrections modeler can output the corrections model (e.g., the covariance matrix, a list of features, an information vector, etc.), a component of the corrections model, and/or any other suitable information. The models can be serialized, batched, or otherwise output. The models can optionally be compressed (e.g., by predicting the zenith ionosphere mean and variance at a series of grid points per thin shell model and using the predicted values instead).

The correction model that the correction modeler uses to determine the GNSS corrections is preferably a Gaussian process and/or a sparse Gaussian process. However, one or more corrections can be generated using machine learning, using a particle filter (e.g., a Kalman filter, an extended Kalman filter, etc.), and/or otherwise generate the GNSS corrections.

The GNSS corrections modeler can include a validator 138, which functions to validate the GNSS corrections. The GNSS corrections can be validated for a predetermined amount of time (e.g., where the GNSS corrections need to be updated after that time) and/or can be indefinitely validated. The GNSS corrections can be validated based on a validation dataset (e.g., a dataset that was withheld from the set of satellite observations used to generate the GNSS corrections, a subset of the data that was used to generate the GNSS corrections, a set of satellite observations associated with one or more reference station such as a validation reference station or master reference station, etc.), a validation model, a residual (or estimated residual) of the receiver position, a comparison of GNSS corrections generated by two or more different models, and/or the GNSS corrections can be otherwise validated.

In examples, the GNSS corrections modeler can include a global corrections modeler 132, a local corrections modeler 133, an interpolator 134, an atmospheric modeler 139, and/or any component disclosed in and/or can determine and/or validate the GNSS corrections as disclosed in U.S. patent application Ser. No. 16/589,932 now U.S. Pat. No. 11,061,141, titled 'SYSTEMS AND METHODS FOR DISTRIBUTED DENSE NETWORK PROCESSING OF SATELLITE POSITIONING DATA' filed 1 Oct. 2019, and as disclosed in U.S. patent application Ser. No. 16/865,077 now U.S. Pat. No. 10,809,388 titled 'SYSTEMS AND METHODS FOR HIGH-INTEGRITY SATELLITE POSITIONING' filed 1 May 2020, each of which is incorporated herein in its entirety by this reference.

The querier 135 preferably functions to store (e.g., cache) GNSS corrections and to process requests for GNSS corrections (e.g., from mobile receivers or reference stations). The querier can store (e.g., cache) the most recent GNSS corrections, a buffer of GNSS corrections, all GNSS corrections (e.g., all GNSS corrections generated, all GNSS corrections generated within a predetermined amount of time, etc.), and/or any suitable GNSS corrections. Additionally or alternatively, the querier 135 can store a buffer of correction models, and uses the stored models to respond to receiver requests. For example, the querier 135 can return predicted ionosphere delays, clock corrections, and/or other corrections determined based on the request parameters (e.g., including the receiver's rough position) and stored correction models.

Examples of requests can include requests for GNSS corrections, requests for particular error sources, paths between a receiver and a data source, and/or any suitable request. In an illustrative example such as for an atmospheric effect, a querier request might look like a set of paths from a receiver (e.g., mobile receiver, reference station receiver, etc.) to several satellites and the response would be the predicted atmospheric delays along those paths.

The stitcher 136 is preferably, but not exclusively, included in variants of the system that process batches of satellite observations to generate the GNSS corrections. The stitcher preferably functions to connect and/or combine the GNSS corrections associated with different batches. Additionally or alternatively, the stitcher can function to prevent discontinuities (e.g., jumps) between GNSS correction updates (e.g., associated with different batches of GNSS observations), constrain discontinuities to be smaller than a threshold (e.g., duration, magnitude, location, etc.), decrease the number of discontinuities, decrease the frequency of discontinuities, and/or other modify the GNSS corrections particularly between updates. Additionally or alternatively, the stitcher 136 can store a buffer of correction models, and generates a larger model (e.g., larger Gaussian process, combination of correction models, etc.) that combines the results from the stored model. The correction models within the buffer are preferably for the same error and extend across multiple timeframes; however, the correction models can be for multiple errors, and extend across the same or different timeframes. In variants including a stitcher, the corrections can be directly output by the stitcher to the receivers, the stitcher-produced models can be provided to the querier 135 for storage and use, or the stitcher-produced models can be otherwise used.

Additionally or alternatively, the stitcher can connect and/or combine the GNSS corrections based on constraints, patchwork kriging, and/or other methods. The GNSS corrections can be constrained and/or connected based on data or corrections associated with an individual reference station (e.g., a 'master reference station'), an individual satellite (e.g., 'a master satellite'), an average reference station (e.g., an average of a plurality of reference stations), a satellite constellation, a plurality of satellites, and/or any suitable data source. In an illustrative example, the stitcher can ensure that a bias estimate associated with a master reference station remains constant between batches and/or GNSS correction updates.

The stitcher 136 can additionally or alternatively function to validate (or cross validate) GNSS corrections, such as relative to a previous GNSS correction. The updated corrections can be compared to the immediately prior GNSS corrections, an average prior GNSS correction (e.g., corresponding to one or more batches), and/or to any suitable corrections. When the GNSS corrections associated with one batch differ by less than or equal to a threshold from another batch, they can be cross validated. When the GNSS corrections associated with one batch differ by greater than a threshold from GNSS correction associated with another batch, the more recent batch can be excluded, the GNSS corrections model can be run again, the older batch can be excluded, outlier detection can be repeated, a flag or warning can be output (e.g., indicative of an unvalidated batch or GNSS correction, of an estimated accuracy of a receiver position using the GNSS corrections, of an estimated integrity of. the receiver position using the GNSS corrections, etc.), and/or the stitcher can otherwise function. However, the GNSS corrections can be cross validated when the difference between GNSS corrections associated with a first batch and a second batch exceeds a threshold and/or can be otherwise cross validated.

The correction generator preferably functions to produce a receiver-specific model of the GNSS corrections (e.g., specific to a reference station receiver, mobile receiver, etc.) for each of a set of receivers. This receiver-specific model can then be used (e.g., by the querier, by the receiver) to determine the receiver-specific corrections. The receiver specific model is preferably generated by querying the GNSS corrections model (e.g., via the querier/stitcher), but can be otherwise generated. The receiver specific model is preferably generated by querying the GNSS corrections model at some points and building a new Gaussian process with an empirical covariance which is chosen to ensure the resulting receiver model will produce substantially the same prediction (e.g., differing from the full corrections model by at most 1%, 2%, 5%, 10%, 20%, 25%, etc.) for the same points. The receiver-specific model can be updated: when a new corrections model is determined by the corrections modeler; in response to occurrence of a redetermination event (e.g., integrity risk exceeds a predetermined threshold, etc.); and/or at any other suitable time. However, the receiver specific model can be additionally or alternatively generated.

The positioning module 139 preferably functions to determine the receiver position using the GNSS corrections. The positioning module 139 is preferably located on the receiver side (e.g., remote from the corrections modeler, querier, stitcher, remote processing system, etc.), but can alternatively be part of the remote processing system or otherwise arranged. The receiver position is preferably determined to a high accuracy (e.g., less than about 1 mm, 5 mm, 1 cm, 2 cm, 5 cm, 1 dm, 2 dm, 5 dm, 1 m, 2 m, 5 m, etc.) and/or to a high integrity (e.g., total integrity risk$<10^{-4}$, $<10^{-5}$, $<10^{-6}$, $<10^{-7}$, $<10^{-8}$, $<10^{-9}$, $10^{-10}$/hr, etc.); however, the receiver position can be determined to any accuracy and/or integrity. In examples, the position module can calculate the receiver position and/or otherwise operate as a 'position module' as disclosed in U.S. patent application Ser. No. 16/865,077 titled 'Systems and Methods for High-Integrity Satellite Positioning' filed 1 May 2020. However, the positioning module can be otherwise configured.

3. Method

The method preferably functions to determine GNSS corrections and/or estimate (e.g., calculate, determine) the position of the mobile receiver using the GNSS corrections. Steps and/or substeps of the method can be performed iteratively (e.g., for different epochs, for the same epoch, etc.), sequentially, and/or in any suitable order. The steps and/or substeps of the method can be performed in series and/or in parallel. The steps and/or substeps are preferably performed by a system as described above, but can be performed by any system.

S110 includes receiving data from a set of data sources. The data sources preferably correspond to reference stations, but can additionally or alternatively include computing systems (e.g., databases, PPP global corrections data sources, etc.) and/or any suitable data sources. The data preferably corresponds to raw (e.g., unprocessed) data, but can additionally or alternatively include processed data. The data preferably corresponds to undifferenced and/or uncombined satellite observations (e.g., as measured at a reference station), but can additionally or alternatively include difference satellite observations, atmospheric delays (e.g., as estimated or determined using a PPP filter), calibration data (e.g., associated with satellites and/or receivers), satellite orbit data, and/or any suitable data.

In some embodiments of the method, the data can be associated with a batch (e.g., set) of data. The data can be batched based on the time of receipt (and/or storage, processing, etc.); a time window during which the data is received (and/or stored, processed, etc.); a location that the data is associated with (e.g., a location of a reference station); and/or be otherwise batched. Each batch of data preferably includes at least woo data points (e.g., satellite observations), but can include less than about woo data points and/or any number of data points.

S115 includes detecting one or more outliers in the data set, which functions to determine whether one or more outliers are present in the data. The outliers can be detected as data is received, before the data is processed, after a batch of data has been received, and/or with any timing. The outliers can be detected within a batch of data, from all data that is received, and/or within any set of data. The outliers are preferably detected using a RANSAC method, but can additionally or alternatively be detected using a MLESAC method, a MAPSAC method, KALMANSAC method, resampling, and/or be detected in any manner.

When one or more outliers are detected, the effects of the outliers can be mitigated. Examples of mitigating the effects of the outliers include: removing the outliers from the dataset, weighting the data (e.g., with a weight that depends on the probability that the data is an outlier and/or inlier), acquiring additional data, and/or otherwise mitigating the impact of outliers.

In some embodiments, one or more outliers can be detected and/or mitigated as disclosed in U.S. patent application Ser. No. 16/748,517 now U.S. Pat. No. 11,624,843 titled "SYSTEMS AND METHODS FOR REDUCED-OUTLIER SATELLITE POSITIONING" filed 21 Jan. 2020, which is herein incorporated in its entirety by this reference. However, the outlier(s) can be detected in any manner.

S120 includes generating a GNSS correction model, which functions to determine a GNSS corrections model to use to generate the GNSS corrections, to set parameters and/or hyperparameters of the GNSS correction model (e.g., in response to data received from reference stations), and/or otherwise generate a GNSS corrections model. The GNSS correction model is preferably generated by a correction modeler (e.g., of the computing system), but can be generated by any component.

Figure 2:
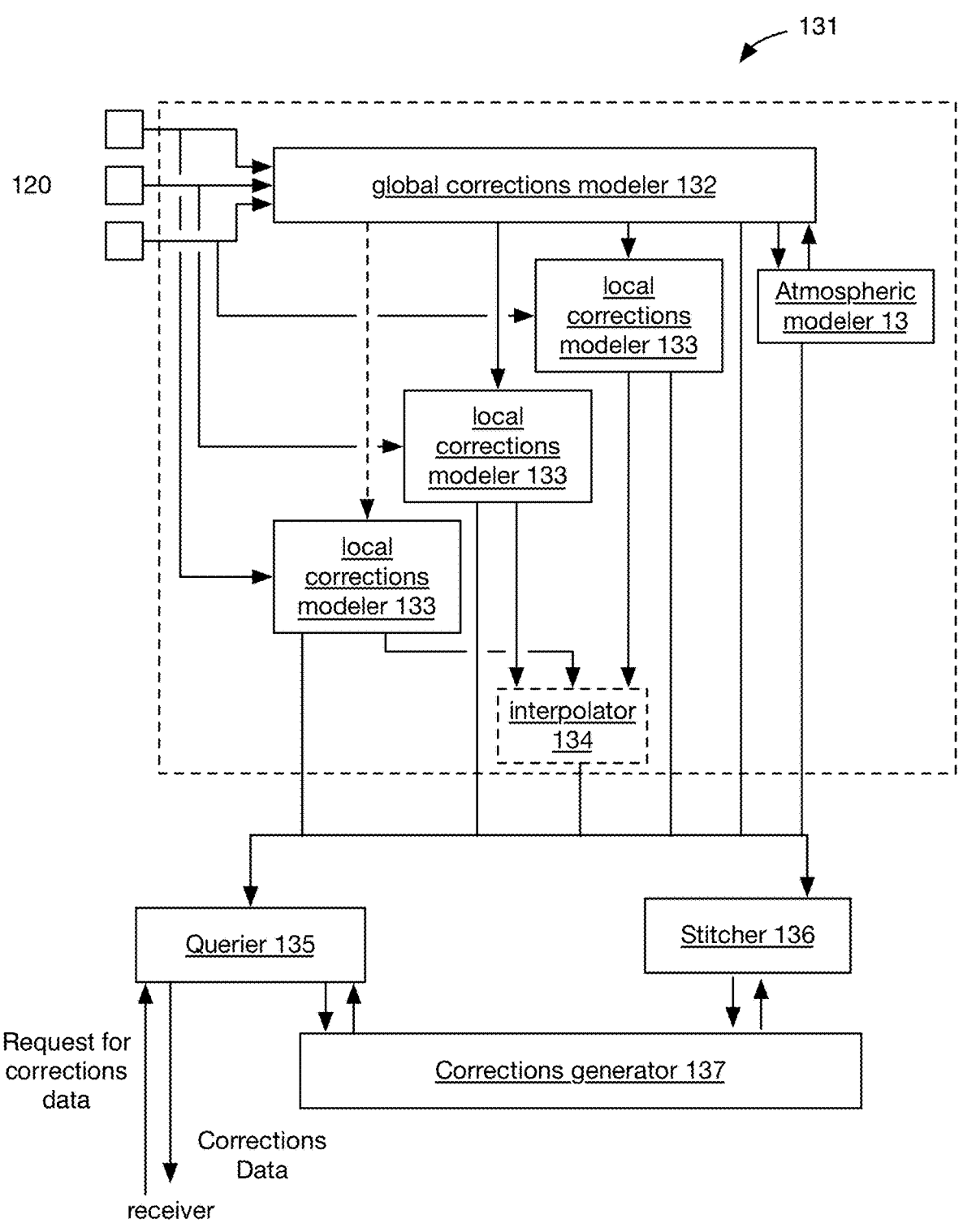
FIG. 2 is a schematic representation of an example of a computing system for determining GNSS corrections.

GNSS corrections models can correct for any error source impacting the satellite observations. For example, as described in U.S. patent application Ser. No. 16/195,427 and as shown in FIG. 2, corrections models may be separated into global models (which model the effects of global and/or spatially invariant errors on GNSS signals) and local models (which model local and/or spatially variant effects on GNSS signals and/or effects that are specific to particular receivers/reference stations). Examples of global effects include satellite-specific effects (e.g., satellite clock error, satellite orbit error, satellite hardware bias, satellite antenna phase windup, phase center offset (PCO), phase center variation (PCV), etc.), satellite-independent effects (e.g., solid earth tides, solid earth pole tides, ocean tidal loading, etc.), and/or other effects. In variants, global effect can include atmospheric effects (e.g., ionospheric and/or tropospheric effects such as coarse estimates of atmospheric effects for example to be used for use initializing a later refinement of the atmospheric effects). Examples of local effects can include receiver-independent effects (e.g., atmospheric effects such as ionospheric effects such as ionosphere delay, ionosphere gradient, etc.; tropospheric effects such as troposphere delay; etc.), receiver-dependent effects (e.g., receiver clock error, receiver hardware bias, receiver antenna phase windup/PCO/PCV, carrier phase ambiguity, multi-path effects, etc.), and/or any local effects. Alternatively, corrections models can correct for any suitable error source(s).

The GNSS corrections model can generate the GNSS corrections in batches (e.g., piecewise such as once a predetermined amount of data is available) and/or continuously. The batches can correspond to temporal batches (e.g., using sets of data that are collected within a time window), spatial batches (e.g., using sets of data that are collected within a spatial area), satellite batches (e.g., generated for specific satellites or sets of satellites), satellite constellation batches, reference station batches (e.g., groups of independent reference stations), and/or any suitable batches. The GNSS corrections model can be beneficial for enable estimation of corrections (e.g., associated with one or more error sources) in a consistent manner (e.g., such that the frequencies can be combined without introducing new errors) for multiple satellite frequencies.

The GNSS corrections model is preferably generated and/or updated using a Gaussian process. The same Gaussian process is preferably used to determine (e.g., estimate) the GNSS correction for each error source (e.g., each error source that is to be accounted for). However, a different Gaussian process can be utilized for subsets of error sources (e.g., a global effect Gaussian process, a local effect Gaussian process, error- or effect-specific Gaussian process(es), etc.), one or more effects and/or errors can be modelled (and/or estimated) using a particle filter (e.g., a Kalman filter), one or more effects and/or errors can be modelled (and/or estimated) using machine learning, and/or the effects and/or errors can be estimated in any manner. Here, "using a Gaussian process" preferably refers to fitting one or more Gaussian process models (which make up at least part of GNSS corrections model) based on the data set (e.g., reference station data). It is important to note that many parameter fitting techniques make assumptions based on Gaussian distributions (e.g., Kalman filters assume Gaussian noise). "Gaussian process" is a term of art (referring to a probability distribution over a set of possible functions) and not intended to refer to simply any parameter fitting technique that includes some aspect of Gaussian statistics. However, a Gaussian process can be otherwise defined.

Figure 6A:
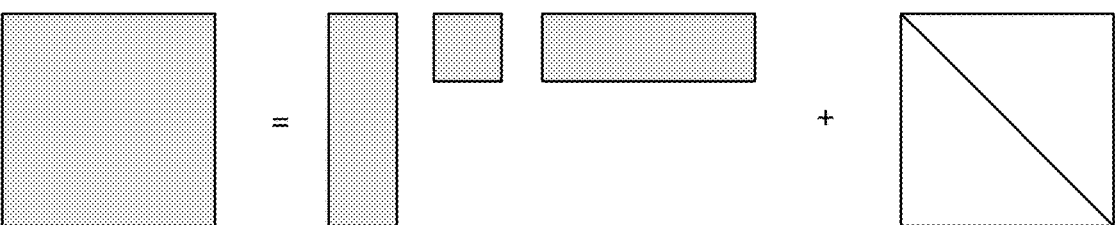
FIGS. 6A, 6B, and 6C are schematic representations of exemplary approximations for covariances (e.g., where spaces in gray show hypothetically related states and areas in white would have no or negligible covariance).
Figure 6B:
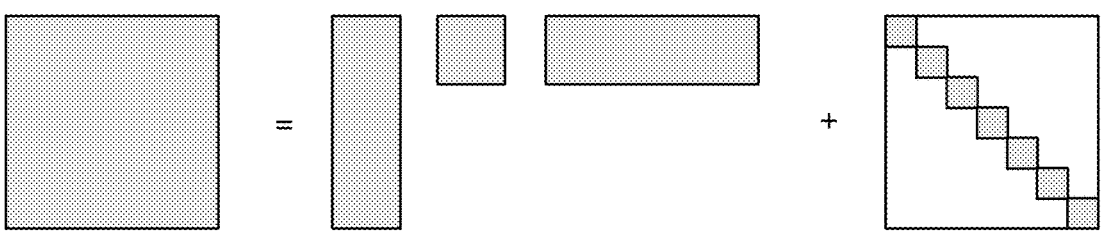
Figure 6C:
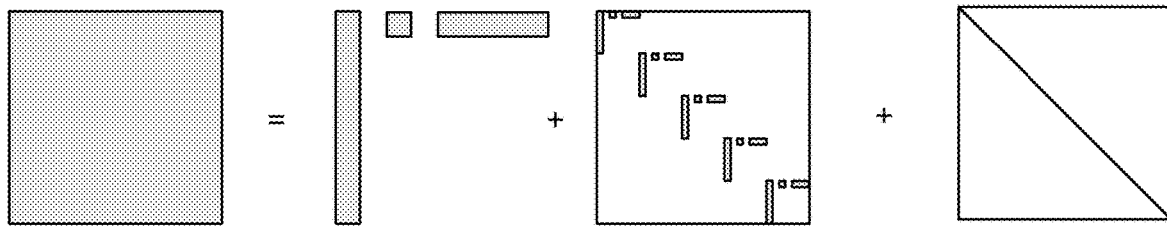

In some variations, the GNSS correction model can include one or more sparse approximations to a Gaussian process. Using a sparse approximation to a Gaussian process can provide the benefit of decreasing the computational load which can be particularly beneficial when a large number of data inputs are used. Examples of sparse approximations that can be used include fully independent training conditional (FITC, as shown schematically for example in FIG. 6A), partially independent training conditional (PITC, as shown schematically for example in FIG. 6B), using a hierarchy (e.g., plurality) of inducing point layers (e.g., a hierarchical gaussian process (HGP), as shown schematically for example in FIG. 6C), a variational free energy (VFE), informative vector machine (IVM), and/or any suitable sparse approximation to the Gaussian process.

Inputs to the correction model can include: undifferenced satellite observations (e.g., pseudorange, carrier phase, code, etc.), uncombined satellite observations, differenced satellite observations (e.g., singled differenced, double differenced, triple differenced, linear combinations, etc.), pierce points, atmospheric delays (e.g., ionosphere delays, troposphere delays, ionosphere gradient, higher order delays, etc. such as modelled using a PPP filter 1200), sensor data (e.g., receiver velocity, receiver vibration, etc.), carrier phase ambiguities (e.g., fixed integer ambiguities, float ambiguities, combined satellite observation ambiguities such as Melbourne Wübbena ambiguities, etc.), corrections (e.g., generated from a different correction model), inducing points, and/or any data or information. In a first illustrative example, the corrections model can receive (and use without processing, combining, differencing, etc.) undifferenced satellite observations. In a second illustrative example, the corrections model can receive differenced satellite observations (e.g., double frequency combinations, triple frequency combinations, Ionosphere-free combination, Geometry-free combination, wide-lane combinations, narrow-lane combinations, Melbourne-Wübbena combination, Group and Phase Ionospheric Calibration (GRAPHIC) combination, combinations using carrier phase and/or code measurements, Hatch-Melbourne-Wübbena, geometry-free and ionosphere-free combinations, etc.). In a third illustrative example, the corrections model can receive undifferenced satellite observations and compute differenced or combined satellite observations. In a first variation of the second or third specific examples, Melbourne-Wübbena combinations can be used to estimate phase biases (e.g., a model that uses Melbourne-Wübbena combinations can be used to estimate phase biases). In a second variation of the second or third specific examples, geometry-free combinations can be used to estimate code biases (e.g., a model that uses geometry-free combinations can be used to estimate code biases). In a third variation of the second or third specific examples, ionosphere-free combinations can be used to estimate clocks (e.g., a model that uses or determined ionosphere-free combinations can be used to estimate clock). In a fourth illustrative example, a first correction model can process a set of satellite observations (e.g., a Melbourne-Wübbena combination) to estimate corrections (e.g., phase biases), where the estimated corrections can be provided to a second corrections model (e.g., that processes a different combination of satellite observations, that processes undifferenced satellite observations, etc. where the second corrections model can compute corrections for biases, clocks, orbits, ionosphere, troposphere, atmospheric effects, etc.; where the second corrections model can minimally vary such as hold locked, vary by at most 10%, etc. the corrections estimated by the first corrections model; where the second corrections model can vary, update, reestimate, etc. the corrections estimated by the first corrections model; etc.). However, the corrections model can receive any suitable information.

In variants including inducing points, the inducing points can function to decrease the number of data inputs necessary for the GNSS corrections model, which can provide the benefit of increasing the computational efficiency and/or speed of the model. Each inducing point preferably corresponds to one or more variables (e.g., state, effects, errors, etc.) related to a data source where data observed by the data source is weakly correlated or uncorrelated with data from other data sources. However, inducing points can correspond to variables of a cluster of data sources (e.g., where the cluster of data sources are weakly or uncorrelated with other data sources and/or clusters of data sources) and/or to any data source. The variable can correspond to a subset of times (e.g., the time associated with a batch of satellite observations, a subset of times associated with a batch of satellite observations, times not associated with a batch of satellite observations, etc.), the entire time over which observations have been made, and/or any suitable time. In variants, the inducing points can include each variable associated with a data source. However, one or more variable associated with a data source can be excluded (e.g., to be accounted for by the Gaussian process), and/or the inducing points can include any suitable variable(s). In an illustrative example, atmospheric effects (e.g., ionosphere delay, ionosphere gradient, troposphere delay, etc.) can be excluded from the set of inducing points (e.g., to be accounted for implicitly by the Gaussian process). However, any variables can be included or excluded from the set of inducing points.

In specific examples, the inducing points can correspond to hardware bias for one or more reference station, clock errors for one or more reference station, atmospheric effects (e.g., ionosphere delay, troposphere delay, ionosphere gradient, etc.) associated with sets or clusters of reference stations, clock errors associated with one or more satellite, hardware bias errors associated with one or more satellite, orbital errors associated with one or more satellite, errors associated with one or more satellite constellations, hardware bias associated with a GNSS receiver, clock errors associated with a GNSS receiver, errors or effects associated with sensors, and/or any suitable effect or error associated with any data source(s).

In a first illustrative example, each inducing point can correspond to variables related to one or more reference stations of the set of reference stations.

In a second illustrative example, variables (e.g., observations; satellite states such as satellite orbit, satellite clocks, satellite biases, etc.) relating to each satellite (e.g., in-view satellite) can correspond to an inducing point. In a variant of the second example, each satellite constellation can correspond to an inducing point.

Outputs from the GNSS correction model can include: GNSS corrections (e.g., accounting for one or more effect and/or error), residuals in the GNSS corrections, confidence in the GNSS corrections (e.g., predicted accuracy and/or integrity of the determined mobile receiver position using the GNSS corrections, likelihood that the GNSS corrections are correct, etc.), carrier phase ambiguities (e.g., fixed integer ambiguities, float ambiguities, etc.), outliers (e.g., outliers in the input data), and/or any output.

Figure 3A:
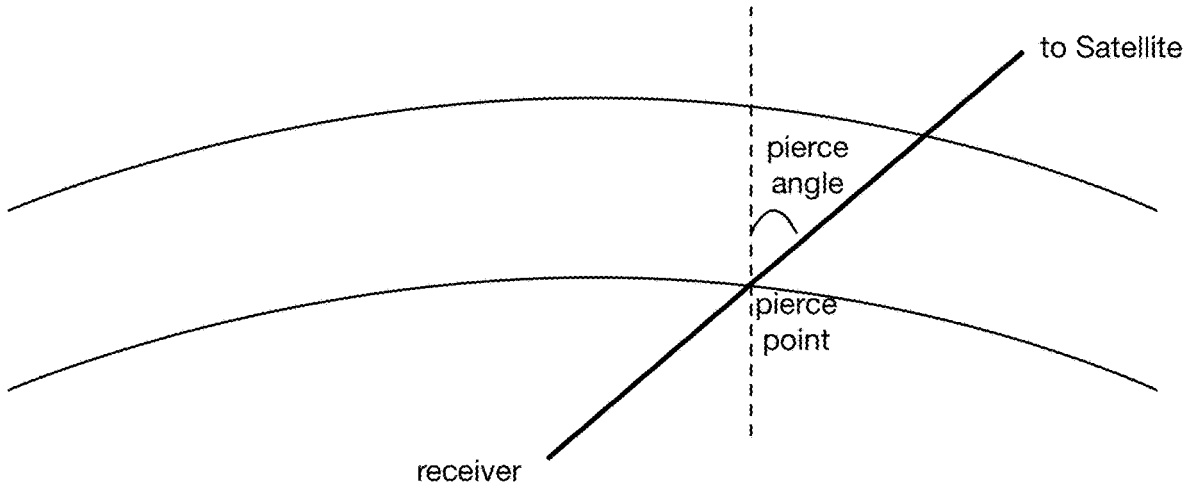
FIGS. 3A and 3B are example representations of atmospheric effect (e.g., ionospheric effect) model parameters.
Figure 3B:
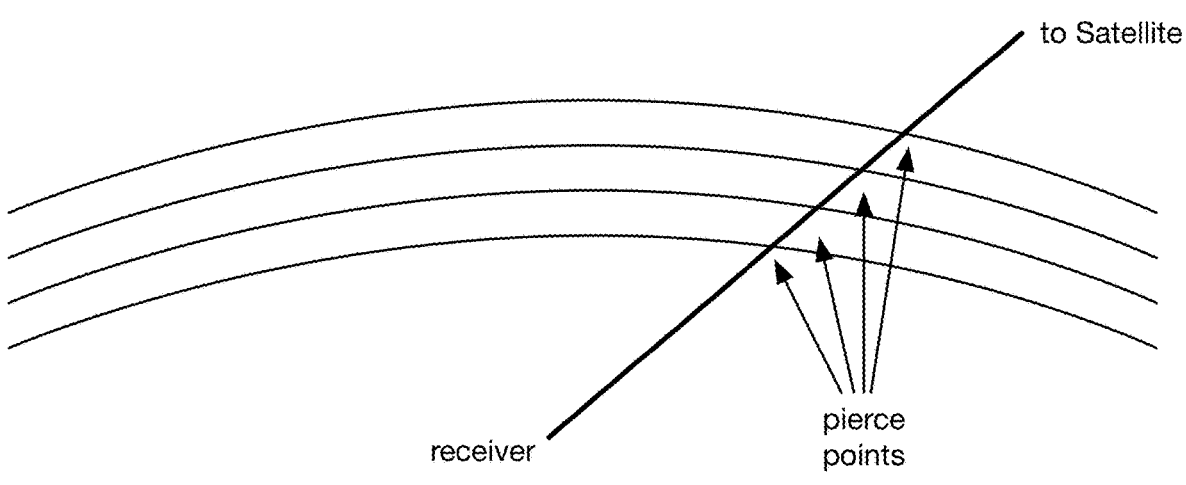

The Gaussian process is preferably associated with (e.g., depends on) a set of parameters. S121 can include determining the set of parameters. The parameters 1500 can be determined (e.g., calculated) in real or near real time, offline, and/or with any timing. The parameters can be determined automatically, semi-automatically, and/or manually. The parameters are preferably retrieved from memory, but can be determined in any manner. The parameters can be static, dynamic, variable, and/or otherwise defined. Examples of parameters can include: covariance function(s), a functional relationship between variables (e.g., a distance function, a time function, etc.), mapping functions, distance functions, pierce points, data inputs, atmospheric shells (e.g., shell thickness, number of shells, type of shell, etc.), hyperparameters, spatio-temporal scales (e.g., spatial, temporal, etc. length scales), and/or any suitable data and/or information. In an illustrative example, parameter covariances may be defined based on a model; e.g., the covariance between ionospheric delay at two positions (e.g., corresponding to two reference stations) may be modeled as a function of the distance between pierce points (where the line of sight between a receiver and a satellite intersects the atmospheric layer as shown in FIGS. 3A and 3B) and/or pierce angles.

A covariance function preferably defines a relationship (e.g., correlation) between two or more variables (such as inputs to the Gaussian process). In specific examples, the covariances can represent covariances between satellite observations at a reference station (e.g., per station covariances, per station bias, etc.), covariances between satellite observations from a single satellite (e.g., per satellite covariances, per satellite bias, etc.), covariances between satellite observations from a satellite constellation (e.g., per satellite constellation covariances), between satellite observations from different reference stations, covariances between satellite observations from different satellites, and/or between any satellite observations. The relationship can be a spatial correlation (e.g., how correlated the variables are in space), a temporal correlation (e.g., how correlated the variables are in time), a dependence (e.g., a model relating one input to another input), a kinematic correlation (e.g., a correlation in speed, acceleration, jerk, etc. of the variables), a frequency correlation (e.g., how correlated the variables are in frequency), a satellite correlation, a reference station correlation, a satellite constellation correlation, combinations thereof, and/or any suitable correlation. Two or more covariance functions can be combined through addition (and/or subtraction), multiplication (and/or division), exponentiation, convolution, and/or in any manner. In an illustrative example, particularly beneficial when combined or differenced satellite observations are used, covariance functions can be combined and/or differenced (e.g., in the same manner as the satellite observations are combined). For instance, when Wübenna-Melbourne combinations of satellite observations are used, the covariance functions can be combined in the same linear combination. However, the covariance functions can otherwise be combined.

The covariance can depend on a difference between the inputs, a magnitude of the difference between the inputs, a parametric function (e.g., a processed input, a function of the inputs, etc.), the inputs independently, a product of the inputs, and/or have any dependence on the inputs.

In a first illustrative example, a covariance function can depend on a distance function, which determines a distance between two locations. Examples of distance functions include: Euclidean distance, great circle distance, geodesic distance, Chebyshev distance, Manhattan distance, Minkowski distance, and/or any distance metric or function.

The distance function is preferably a radial basis function, but can include a spherical basis function, azimuthal basis function, altitude basis function, zenith basis function, and/or any basis functions.

In a second illustrative example, a covariance function can depend on (and/or include) a mapping function (e.g., $m(p)$), which functions to correct for the distance that a signal (e.g., satellite observation) spends in a spatial region. Examples of mapping functions include: obliquity (e.g., $m(p)=\sec(\theta_i)$ where $\theta_i$ is the angle that the signal intersects the shell relative to a reference axis such as an axis normal to a shell, normal to the surface of the earth, vertical axis, horizontal axis, etc.), Niell mapping functions, Isobaric mapping functions, Vienna mapping functions, Global mapping functions, hydrostatic mapping function, wet mapping function, and/or any suitable mapping function.

Examples of covariance functions include: constant functions, polynomial (e.g., linear, quadratic, piecewise smooth polynomials, etc.) functions, white noise functions, Kronecker delta (or Dirac delta function) functions, squared exponential functions, Ornstein-Uhlenbeck (e.g., Brownian) functions, (e.g., with variable drift terms that are dependent on the current value of the process), Weiner functions, Matérn functions, Bessel functions, periodic functions, rational (e.g., rational quadratic) functions, γ-exponential functions, neural network covariance functions, and/or any suitable covariance function.

The covariance function can lead to isotropic (e.g., covariance function depends on the magnitude of a difference between the inputs) and/or anisotropic (e.g., covariance function does not depend on the magnitude of a difference between the inputs) Gaussian processes.

The covariance function can lead to a stationary and/or nonstationary Gaussian process. The covariance function can lead to a periodic or aperiodic Gaussian process.

The covariance function can lead to a smooth, mostly smooth (e.g., at least 60% of the Gaussian process accounted for by a covariance function that leads to a smooth Gaussian process), partially smooth (e.g., between about 40-60% of the Gaussian process accounted for by a covariance function that leads to a smooth Gaussian process), mostly not smooth (e.g., at most 40% of the Gaussian process accounted for by a covariance function that leads to a smooth Gaussian process), and/or not smooth (e.g., jittery) Gaussian process.

Each covariance function is preferably associated with one or more hyperparameters, which function to describe a correlation strength (e.g., correlation amplitude), a variance, a memory, a decorrelation scale (e.g., length scale, duration, etc. over which the inputs decorrelate by a threshold value such as to 50%, 40%, 33%, 30%, 25%, 20%, 15%, 10%, 5%, 2.5%, 2%, 1%, 0.5%, 0.1%, etc.; $1/e$, $1/e^2$, $1/e^3$, etc.; etc. relative to the maximum correlation strength), and/or otherwise characterize the correlation and/or covariance function.

In a first specific example, a covariance function for a satellite and/or receiver (e.g., reference stations, mobile receiver, etc.) error (such as a hardware bias, clock error, orbit error) can be an Ornstein-Uhlenbeck function such as:

$$c_{error}(z_i, z_j) = \sigma_{error}^2 e^{-\alpha_{error}|t_i - t_j|}$$

Where $z_i$ and $z_j$ are two observations corresponding to times $t_i$ and $t_j$ respectively, and $$\sigma_{error}^2 \text{ and } \alpha_{error}$$

are hyperparameters which represent the total variance explained by the station clock and the time scale which indicates how much "memory" the station clock has or how quickly it de-correlates respectively.

In a second specific example, a covariance function for a satellite and/or receiver (e.g., reference stations, mobile receiver, etc.) error (such as a hardware bias, clock error, orbit error) can be a squared exponential function such as:

$$c_{error}(z_i, z_j) = \sigma_{error}^2 e^{-\alpha_{error}(t_i - t_j)^2}$$

In a third specific example, a covariance function for a satellite and/or receiver (e.g., reference stations, mobile receiver, etc.) error (such as a hardware bias, clock error, orbit error) can be a sum of an Ornstein-Uhlenbeck function and a squared exponential function such as:

$$c_{error}(z_i, z_j) = \left( \sigma_{error,ORN}^2 e^{-\alpha_{error,ORN}|t_i - t_j|} + \sigma_{error,GAU}^2 e^{-\alpha_{error,GAU}(t_i - t_j)^2} \right)$$

Where the relative magnitudes of the hyper parameters $$\sigma_{error,GAU}^2 \text{ and } \sigma_{error,ORN}^2$$

can be related to the relative contribution of the processes to the error, where $$\sigma_{error,GAU}^2 + \sigma_{error,ORN}^2 = \sigma_{error}^2,$$

and where $\alpha_{error,ORN}$ and $\alpha_{error,GAU}$ can have any relation. However, $$\sigma_{error,GAU}^2 \text{ and } \sigma_{error,ORN}^2$$

can be related in any manner.

In a fourth specific example, a position covariance function can be a polynomial covariance function such as:

$$c_{pos}(z_i, z_j) = \sigma_{pos}^2 u_i^T u_j$$

Where $u_i$ is the unit vector pointing from the receiver to the satellite observed by observation $z_i$.

In a fifth specific example, a covariance function can include a term such as:

$$c_{error}(z_i, z_j) = IsSameFreq(z_i, z_j)$$

$$c_{error}(z_i, z_j) = IsSameType(z_i, z_j)$$

$$\text{Or } c_{error}(z_i, z_j) = IsSameSource(z_i, z_j)$$

where $IsSameX(z_i, z_j)$ returns 1 if true and 0 if false, where Freq refers to the carrier frequency corresponding to the satellite observation (e.g., the L1, L2, L5, E1, E5a, E5b, E5ab, E6, G1, G2, G3, B1, B2, B3, LEX, etc. frequencies), Type refers to the type of satellite observation (e.g., pseudorange, carrier phase, code, etc.), and Source refers to the data source (e.g., reference station, mobile receiver, satellite, satellite constellation, etc.).

Figure 3C:
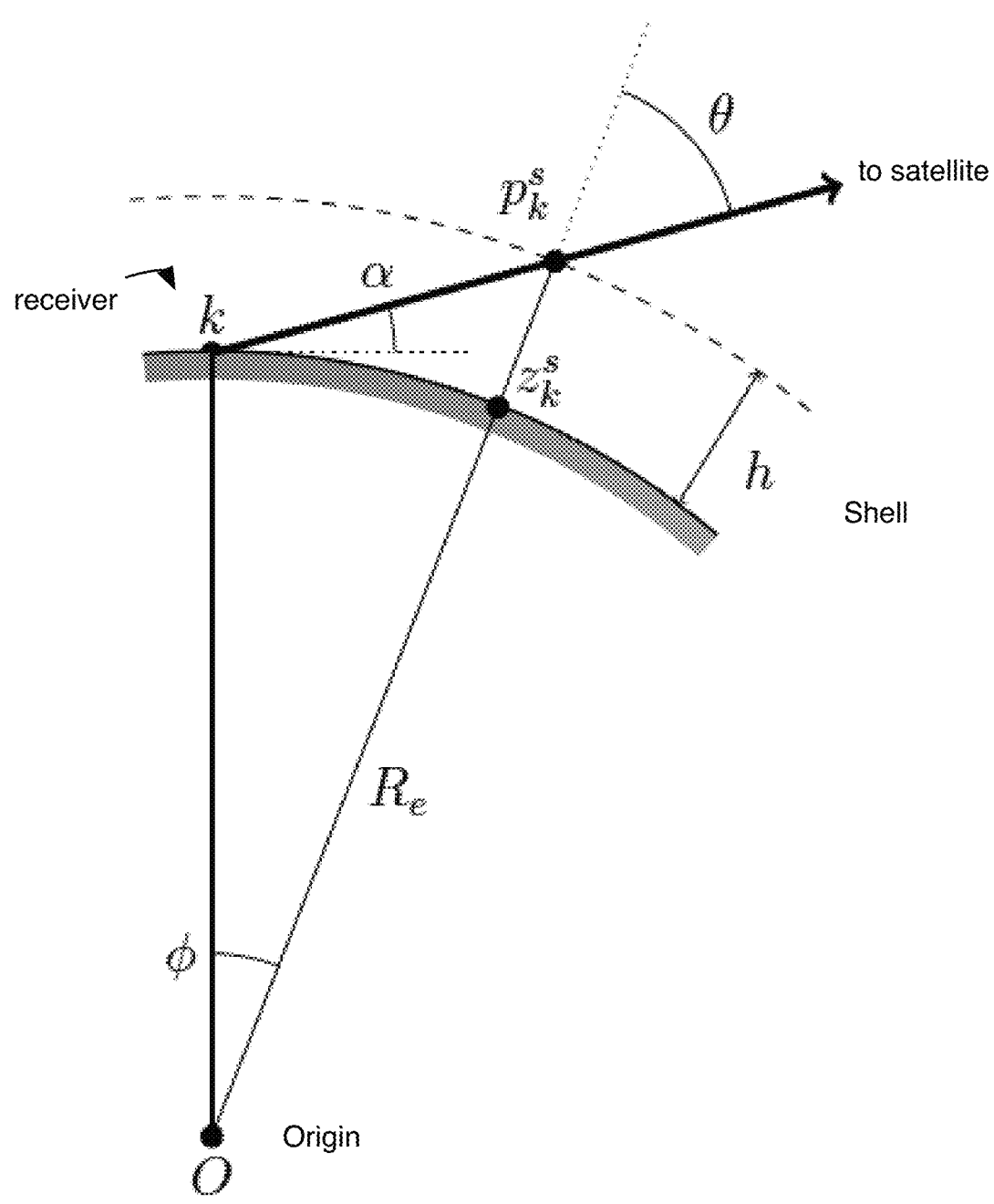
FIG. 3C is a schematic representation of an example of a coordinate system used in embodiments of an atmospheric effects model, where the origin can refer to the center of the earth or any suitable reference point.

In a sixth specific example, an atmospheric covariance function (e.g., an ionosphere or troposphere covariance function) can be a squared gaussian function such as:

$$c_{atm}(p_i, p_j) = \sigma_{atm}^2 e^{-\alpha_{atm} d(p_i, p_j)^2}$$

$$\text{Or } c_{vert}(p_i, p_j) = \sigma_{vert}^2 e^{-\alpha_{vert} h(p_i, p_j)^2}$$

Where $p_i$ and $p_j$ correspond to two pierce points (for example as shown in FIGS. 3A, 3B, and 3C), $d(p_i, p_j)$ corresponds to a distance function between the two pierce points, and $h(pi,pj)$ corresponds to a height difference between the two pierce points.

In a seventh specific example, an atmospheric covariance function (e.g., an ionosphere or troposphere covariance function) can be an Ornstein-Uhlenbeck function such as:

$$c_{atm}(p_k^s, p_{k'}^{s'}) = \sigma_{atm}^2 e^{-\alpha_{atm}|p_k^s - p_{k'}^{s'}|}$$

In an eighth specific example, an atmospheric covariance function (e.g., an ionosphere or troposphere covariance function) can be a product of a mapping function (e.g., m(x)) and a covariance function such as:

$$c_{shell}(p_k^s p_{k'}^{s'}) = m(p_k^s) * c_{atm}(p_k^s p_{k'}^{s'}) * m(p_{k'}^{s'})$$

where $$c_{atm}(p_k^s p_{k'}^{s'})$$

can represent the correlation between the electron content at two different points in space.

$$m(p_k^s)$$

can represent the obliquity $$(m(p_i^s) = 1/\cos(\theta_i),$$

where $\theta_i$ is the angle at which a signal intersects the shell (e.g., relative to vertical), and/or be any other suitable mapping function.

In a ninth specific example, an atmospheric covariance function can be a convolution of covariance functions such as:

$$c_{atm\_multiple}(I_{1,k}^s, I_{1,k'}^{s'}) = \sum_i^m \sum_j^m c_{vert}(p_{k,i}^s, p_{k,j}^s) * c_{shell}(p_{k,i}^s, p_{k,j}^s)$$

Where $$I_{1,k}^s$$

corresponds to the ionosphere delay 1250.

In a tenth specific example, an atmospheric covariance functions can be an Ornstein-Uhlenbeck function such as:

$$c_{atm}(p_k^s, p_{k'}^{s'}) = \sigma_{atm}^2 e^{-\frac{|p_k^s - p_{k'}^{s'}|}{l_{atm}}}$$

Where $I_{atm}$ is a hyperparameter corresponding to a length scale for the decorrelation of the pierce points. In this specific example, a mean of the covariance function can be given by:

$$\mu(p_k^s) = a_{atm} + I_{k,model}^s$$

Where $\mu$ corresponds to the mean, $a_{atm}$ corresponds to an inferred atmospheric offset, and $$I_{k,model}^s$$

corresponds to the value that a model (e.g., the klobuchar model of the ionosphere, klobuchar model, NeQuick model, BeiDou global broadcast ionospheric delay correction model [BDGIM], etc.) would give for the zenith ionosphere delay at location $$p_k^s.$$

In an eleventh specific example, the atmospheric model includes a Gaussian process that uses covariances that model: a per-satellite bias (e.g., even with high-precision clock/orbit products), a multi-shell model (e.g., multiple shells for all satellites, one shell per satellite, etc.), and the great circle distance. However, the atmospheric model can be otherwise modelled.

In a twelfth specific example, the covariance function can be a sum, product, convolution, and/or otherwise combine any or all of the covariance functions from the preceding examples (e.g., a sum of the $c_{atm\_multiple}$, $c_{station}$, $c_{satellite}$). However, any covariance function can be used for any models and/or error(s).

In variants, the atmospheric model can include and/or correspond to a multi-shell model. The multi-shell model can refer to a plurality of shells, a shell associated with each satellite, a shell associated with each satellite constellation, and/or any suitable shells. Each shell of the multi-shell model can have the same or different thickness. However, the atmospheric model can include a single shell, model the atmosphere continuously, and/or otherwise model the atmosphere.

S121 may additionally or alternatively include modifying such models (or changing models) for covariance dynamically based on input data. For example, S121 may include a preprocessing step that determines how active the atmosphere (e.g., ionosphere, troposphere) is and adjusts model hyperparameters based on the activity. More generally, S121 may include tuning model parameters, covariance terms, and/or hyperparameters in any manner.

S121 may include selecting not only the parameters to be modeled but also the times at which these parameters should be modeled (and may include multiple time steps per parameter).

S121 may additionally include setting constraints. For example, S121 may include constraining the Gaussian process such that the mean variation of ionospheric delay and hardware bias (for a given receiver/satellite pair) is zero. Other useful constraints may include setting the mean of satellite clocks to zero (or some other value), stitching multiple models together (e.g., via enforcing boundary constraints at transition times between models, such as performed by a stitcher, etc.), setting a mean of the atmospheric model to the mean that generated by the an atmospheric model $$\left(e.g., \mu(p_k^s) = a_{atm} + I_{k,model}^s,\right.$$

where the model can be the klobuchar model, NeQuick model, BeiDou global broadcast ionospheric delay correction model [BDGIM], etc.), and/or applying any constraints to the parameters and/or hyperparametrers.

S120 can include determining the parameters and/or hyperparameters associated with the GNSS corrections model S122. S122 functions to determine the values of the parameters and/or hyperparameters used by the GNSS corrections generation model based on the reference data input. S122 can use reference data (e.g., a subset of the dataset, a separate reference dataset, a dataset that partially overlaps the data set, etc.), past parameter estimates (raw estimates, smoothed estimates, posterior state values, etc.), and/or any suitable data to determine GNSS correction model parameters.

The parameters and/or hyperparameters are preferably selected based on a quality metric. The quality metric can be a residual, a correction likelihood, an out-of-sample error, a root mean squared error, and/or other metric. The quality metric is preferably associated with a tuning dataset (e.g., test dataset, training dataset, etc.), which can be the same as the dataset used to generate the GNSS corrections, a subset of the GNSS corrections, and/or a different dataset from the dataset used to generate the GNSS corrections. The parameters and/or hyperparameters can be selected when the quality metric is less than a threshold, greater than a threshold, and/or equal to a threshold. In a specific example, the parameters and/or hyperparameters can be selected based on optimizing (e.g., minimizing, maximizing) the quality metric. However, the parameters and/or hyperparameters can be otherwise selected.

In some variants, a plurality of quality metrics can be determined. The plurality of quality metrics can correspond to the same or different tuning datasets. Each quality metric can correspond to the same set of parameters and/or hyperparameters or to a different set of parameters and/or hyperparameters. In these variants, the correction model can be selected based on a predetermined quality metric, an extremum (e.g., minimum, maximum, etc.) quality metric, an average quality metric, based on a weighted quality metric, using voting, and/or otherwise be selected based on the quality metric.

In a specific example, the correction model (and/or parameters or hyperparameters thereof) can be determined by withholding one or more data sources (e.g., withhold data associated with one or more reference station, sensor, satellite, satellite constellation, etc.), predicting the GNSS corrections for the withheld data source using the remaining data sources and the GNSS corrections model, determining a quality metric based on using the GNSS corrections for the withheld data source(s), and/or otherwise determined. This specific example can optionally include removing a mean from the withheld data sources to correct for a bias of the data source before and/or while determining the quality metric. The quality metric can be the RMSE, a log likelihood of errors, and/or any suitable quality metric. This specific example can be repeated for a plurality of withheld data sources, for a plurality of correction models (and/or parameters or hyperparameters thereof), and/or be otherwise repeated for selecting the correction model. The parameters, hyperparameters, and/or corrections model can then be selected as the values that have the highest likelihood of being correct, that have the lowest residual, the smallest root mean square error, that most accurately predict the GNSS corrections for each data source, and/or be otherwise selected.

In a related example, the GNSS corrections can be determined using data collected from the data sources during a first duration (e.g., $t_0$ to $t_1$) and the quality metric can be determined based on data collected from the data sources for a second duration (e.g., $t_0$ to $t_2$, $t_a$ to $t_b$, $t_1$ to $t_2$, etc.). In variants of this example, the GNSS corrections can be valid during and/or used during the first duration, the second duration, and/or for any suitable time duration.

For example, a set of parameters is calculated on a first set of reference data. Later, as new data is available, S122 may include recalculating the parameter set based on some combination of the new and old data (perhaps not including any of the old data); however, S122 may additionally or alternatively include updating one or more parameters from the initial set using the new data.

However, the correction model can be otherwise selected.

S130 includes generating a set of GNSS corrections. S130 functions to generate a set of GNSS corrections using the GNSS corrections model parameters S120. These corrections are preferably generated in a form usable by the receiver for which corrections are desired, but can additionally or alternatively be generated in any form. For example, when the receiver can accept PPP corrections, S130 can generate corrections in the form of PPP corrections (though, in contrast to true PPP corrections, the GNSS corrections generated by S130 may depend upon receiver position estimate or another spatial term). Additionally or alternatively, S130 may send corrections in the form of RTK corrections (e.g., of a virtual reference station), RTK-PPP corrections, SBAS corrections, and/or in any other form (e.g., local coefficients that are part of a local model, global coefficients that are part of a global model, etc.). Note that local and global corrections may happen in any order (and may be synchronous or asynchronous).

S130 may include dynamically adjusting the models used to generate GNSS corrections in any manner. For example, S130 may include switching between models at any time based on changing conditions.

S130 may additionally include caching model output S131 (and generating corrections using cached model output). Accordingly, in some embodiments, cached data can be used in addition to or instead of real-time data. Additionally or alternatively, new parameters may be estimated based on a predicted variation in time (e.g., predicted from cached values), or S130 may not rely on cached and/or predicted outputs.

S130 may also include calculating not only GNSS corrections but also uncertainty estimates for these corrections (e.g., based on uncertainty in input parameters).

In variants, S130 can include fixing the carrier phase ambiguity associated with one or more satellites in line-of-view of the receiver to an integer value. The carrier phase ambiguity can be fixed as part of the GNSS corrections model, as disclosed in U.S. patent application Ser. No. 16/817,196 now U.S. Pat. No. 11,035,961 titled "SYSTEMS AND METHODS FOR REAL TIME KINEMATIC SATELLITE POSITIONING," filed 12 Mar. 2020 or U.S. patent application Ser. No. 16/865,077 now U.S. Pat. No. 10,809, 388 titled 'Systems and Methods for High-Integrity Satellite Positioning' filed 1 May 2020 each of which is incorporated herein in its entirety by this reference, and/or can be otherwise fixed or constrained. In some embodiments of the method, the carrier phase ambiguity can be resolved (e.g., as a floating carrier phase ambiguity, as an integer carrier phase ambiguity, etc.), before the corrections are determined (e.g., to input the carrier phase ambiguity into the model for determining the corrections).

In some variants, determining the GNSS corrections can include updating the data to include new data, new batches of data, new inducing points, and/or otherwise incorporate new groups of data. The new data is preferably not correlated with the existing data, but can be correlated with the existing data. In a specific example, updating the GNSS corrections model can include computing $$\Lambda_b^{-1/2},$$

computing (or updating) a QR decomposition $$\hat{Q}\hat{R}\hat{P}^T = \left[ R_a P_a^T \Lambda_b^{-1/2} K_{bu} \right],$$

and setting $$\hat{v} = \hat{P}\hat{R}^{-1}\hat{Q}^T \left[ R_a P_a^T v_a \Lambda_b^{-1/2} y_b \right];$$

where $y_a$ corresponds to a first set of observations (e.g., existing data), $y_b$ corresponds to new data, $\Lambda_f$ is a diagonal or block diagonal matrix corresponding to a difference between $K_{ff}$ (e.g., covariance function) and $Q_{ff}$ (e.g., variance in f that can be explained by observation u), QR corresponds to the QR decomposition of a matrix, P is a permutation matrix computed during an $LDL^T$, QR, or Cholesky decomposition, $v_a$ is the information vector corresponding to $y_a$ and v is the information vector. However, the data can be updated in any manner.

In some variants, determining the GNSS corrections can include rebasing (and/or updating) the inducing points of the GNSS corrections model, which can be particularly, but not exclusively, beneficial for sparse Gaussian processes. Rebasing the inducing points functions to translate a set of inducing points, u, and to be relative to some new inducing points, z. Rebasing the inducing points can include switching inducing points by predicting the prior for the new inducing points then recomputing the quantities stored in a fit. In a specific example, rebasing the inducing points can include: computing the posterior prediction associated with inducing points z $$(\text{e.g.,}\ z \sim N(m_z, P_{zz}));$$

computing $$v_z = K_{zz}^{-1} m_z,$$

computing $$P_{zz}^{-1/2} K_{zz},$$

computing the LDLT of $$\left(P_{zz}^{-1/2} K_{zz}\right)^T \left(P_{zz}^{-1/2} K_{zz}\right);$$

and setting $P_{zz} = C^T$ and $R_z = D^{1/2} L^T$; where D is a diagonal matrix, R is a residual matrix, and C is a Cholesky matrix. However, the inducing points can be rebased in any manner.

S130 can include validating the GNSS corrections S135. The GNSS corrections can be valid indefinitely, for a validation time (e.g., a predetermined time), and/or be valid for any suitable time. The GNSS corrections are preferably validated using a validation dataset (e.g., a subset of the dataset used to generate the GNSS corrections, a distinct set of data from that used to generate the GNSS corrections, etc.), but can be validated against a different GNSS corrections model (e.g., different parameters, different hyperparameters, different model assumptions, etc.), and/or in any manner. The GNSS corrections are preferably validated when a residual of the GNSS corrections as applied to the validation dataset is less than a threshold. When the residual of the GNSS corrections as applied to the validation dataset is greater than the threshold the GNSS corrections can be recalculated, the GNSS corrections model can be updated (e.g., reparametrized, hyperparameters redetermined, etc.), additional data can be acquired, outliers detection can be repeated, a flag or warning can be included with the GNSS corrections (e.g., an unvalidated flag, an estimated accuracy or integrity accessible flag, a GNSS corrections unavailable flag, etc.), and/or any suitable response can occur. However, the GNSS corrections can be otherwise validated.

In some examples, the GNSS corrections can be validated (and/or generated) as disclosed in U.S. patent application Ser. No. 16/865,077 titled 'Systems and Methods for High-Integrity Satellite Positioning' filed 1 May 2020.

S140 includes transmitting the set of GNSS corrections. S140 functions to transmit the GNSS corrections to a mobile receiver for which GNSS corrections are desired. GNSS corrections can be transmitted wirelessly (e.g., over a cellular, Wi-Fi, satellite, etc. network), over a wired connection, and/or in any manner.

S150 includes correcting a position estimate using the set of GNSS corrections. The position estimate can be calculated at the mobile receiver, at a computing system (e.g., positioning module associated with a corrections generator), and/or at any suitable component. In some embodiments, it can be desirable for the position estimate to be calculated by the GNSS corrections generation source (while this may have higher latency, the GNSS corrections generation may in some cases be performed by substantially more powerful computers than positioning calculation at the receiver). In this case, S150 includes receiving a position estimate from a receiver and correcting this position estimate using the GNSS corrections generated in S130 (after which the corrected position may be transmitted back to the receiver and/or to any other location).

The methods of the preferred embodiment and variations thereof can be embodied and/or implemented at least in part as a machine configured to receive a computer-readable medium storing computer-readable instructions. The instructions are preferably executed by computer-executable components preferably integrated with a system for GNSS corrections generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for determining a mobile receiver position comprising:

receiving a set of satellite observations; and generating a set of GNSS corrections using a set of Gaussian processes, wherein inputs to the set of Gaussian processes comprise a set of covariance functions relating combinations of satellite observations from the set of satellite observations, wherein the set of covariance functions comprise:

a covariance function relating satellite orbit errors between two satellite observations;

a covariance function relating hardware bias between two satellite observations;

a covariance function relating clock errors between two satellite observations; and a covariance function relating atmospheric delays comprising:

a radial covariance function relating a first pierce point associated with a first satellite observation and a second pierce point associated with a second satellite observation comprising a squared exponential function relating a great circle distance between the first pierce point and the second pierce point; and an altitude covariance function relating an altitude of the first pierce point and an altitude of the second pierce point;

wherein a mobile receiver receives a second set of satellite observations, corrects the second set of satellite observations using the set of GNSS corrections; and determines a position of the mobile receiver using the set of corrected satellite observations.

2. The method of claim 1, wherein at least one of:

the covariance function relating satellite orbit errors between two satellite observations comprises a sum of a constant function, a squared exponential function, and an Ornstein-Uhlenbeck function;

the covariance function relating hardware bias between two satellite observations comprises a sum of a squared exponential function and an Ornstein-Uhlenbeck function; or the covariance function relating clock errors between two satellite observations comprises an Ornstein-Uhlenbeck function.

3. The method of claim 1, wherein one or more hyperparameters associated with at least one of the covariance functions is determined using a numerical optimization routine.

4. The method of claim 3, wherein the numerical optimization determines the one or more hyperparameters that minimize an out-of-sample error.

5. The method of claim 1, further comprising determining Melbourne-Wübbena combinations from the set of satellite observations, wherein the inputs to the set of Gaussian processes comprise the Melbourne-Wübbena combinations.

6. A method for determining a mobile receiver position comprising:

receiving a set of satellite observations; and generating a set of GNSS corrections using a set of Gaussian processes, wherein inputs to the set of Gaussian processes comprise a set of covariance functions relating combinations of satellite observations from the set of satellite observations, wherein the set of covariance functions comprise:

a covariance function relating satellite orbit errors between two satellite observations;

a covariance function relating hardware bias between two satellite observations; and a covariance function relating clock errors between two satellite observations;

wherein at least one of:

the covariance function relating satellite orbit errors between two satellite observations comprises a sum of a constant function, a squared exponential function, and an Ornstein-Uhlenbeck function;

the covariance function relating hardware bias between two satellite observations comprises a sum of a squared exponential function and an Ornstein-Uhlenbeck function; or the covariance function relating clock errors between two satellite observations comprises an Ornstein-Uhlenbeck function;

wherein a mobile receiver receives a second set of satellite observations, corrects the second set of satellite observations using the set of GNSS corrections; and determines a position of the mobile receiver using the set of corrected satellite observations.

7. The method of claim 6, wherein the set of covariance functions further comprises a covariance function relating atmospheric delays comprising:

a radial covariance function relating a first pierce point associated with a first satellite observation and a second pierce point associated with a second satellite observation; and an altitude covariance function relating an altitude of the first pierce point and an altitude of the second pierce point.

8. The method of claim 7, wherein the radial covariance function comprises a squared exponential function relating a great circle distance between the first pierce point and the second pierce point.

9. The method of claim 6, wherein one or more hyperparameters associated with at least one of the covariance functions is determined using a numerical optimization routine.

10. The method of claim 9, wherein the numerical optimization determines the one or more hyperparameters that minimize an out-of-sample error.

11. The method of claim 6, further comprising determining Melbourne-Wübbena combinations from the set of satellite observations, wherein the inputs to the set of Gaussian processes comprise the Melbourne-Wübbena combinations.

* * * * *